United States Patent
Amizur et al.

(10) Patent No.: US 10,230,504 B2
(45) Date of Patent: Mar. 12, 2019

(54) APPARATUS, SYSTEM AND METHOD OF MULTI USER (MU) FINE TIMING MEASUREMENT (FTM)

(71) Applicant: INTEL IP CORPORATION, Santa Clara, CA (US)

(72) Inventors: Yuval Amizur, Kfar-Saba (IL); Leor Banin, Petach Tikva (IL); Nir Dvorecki, Herzeliya (IL)

(73) Assignee: INTEL IP CORPORATION, Santa Clara, CA (US)

( * ) Notice: Subject to any disclaimer, the term of this patent is extended or adjusted under 35 U.S.C. 154(b) by 133 days.

(21) Appl. No.: 15/281,098

(22) Filed: Sep. 30, 2016

(65) Prior Publication Data

US 2017/0295004 A1    Oct. 12, 2017

Related U.S. Application Data

(60) Provisional application No. 62/319,404, filed on Apr. 7, 2016.

(51) Int. Cl.
*H04L 5/00* (2006.01)
*H04L 27/26* (2006.01)
(Continued)

(52) U.S. Cl.
CPC .......... *H04L 5/0023* (2013.01); *H04L 5/0048* (2013.01); *H04L 5/0078* (2013.01);
(Continued)

(58) Field of Classification Search
CPC .. H04B 7/0452; H04B 7/2121; H04B 7/2123; H04L 5/0053; H04W 76/27;
(Continued)

(56) References Cited

U.S. PATENT DOCUMENTS

2016/0295581 A1* 10/2016 Ghosh ............... H04W 72/0446
2016/0323424 A1* 11/2016 Merlin .................... H04L 69/22
(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Robert J Lopata
(74) *Attorney, Agent, or Firm* — Shichrur & Co.

(57) ABSTRACT

Some demonstrative embodiments include apparatuses, systems and/or methods of Multi User (MU) Fine Timing Measurement (FTM). For example, a wireless station may be configured to transmit a trigger frame including a resource allocation of a plurality of resource slots to a plurality of wireless stations; to process a plurality of Non-Data Packet (NDP) transmissions from the plurality of wireless stations according to the resource allocation; to transmit an NDP; and to transmit a MU FTM message including timing information corresponding to the NDP and timing information corresponding to the plurality of NDP transmissions from the plurality of wireless stations.

25 Claims, 10 Drawing Sheets

(51) Int. Cl.
*H04W 64/00* (2009.01)
*H04B 7/0452* (2017.01)
*H04L 5/14* (2006.01)
*H04W 56/00* (2009.01)

(52) U.S. Cl.
CPC ............ *H04L 5/0091* (2013.01); *H04L 27/26* (2013.01); *H04W 64/00* (2013.01); *H04B 7/0452* (2013.01); *H04L 5/1469* (2013.01); *H04W 56/001* (2013.01)

(58) Field of Classification Search
CPC ..... H04W 72/04; H04W 72/12; H04W 76/00; H04J 2203/0069; H04Q 2213/394
USPC ......................................................... 370/329
See application file for complete search history.

(56) References Cited

U.S. PATENT DOCUMENTS

2017/0251449 A1* 8/2017 Malik ................. H04W 64/003
2018/0041990 A1* 2/2018 Venkatesan ........... H04W 72/04

OTHER PUBLICATIONS

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

* cited by examiner

APPARATUS, SYSTEM AND METHOD OF MULTI USER (MU) FINE TIMING MEASUREMENT (FTM)

CROSS REFERENCE

This Application claims the benefit of and priority from U.S. Provisional Patent Application No. 62/319,404 entitled "APPARATUS, SYSTEM AND METHOD OF FINE TIMING MEASUREMENT (FTM)", filed Apr. 7, 2016, the entire disclosure of which is incorporated herein by reference.

TECHNICAL FIELD

Embodiments described herein generally relate to Multi User (MU) Fine Timing Measurement (FTM).

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

A Multi User (MU) Fine Timing Measurement (FTM) Protocol, e.g., in accordance with an IEEE 802.11REVmc Specification, may include measuring a Round Trip Time (RTT) from a wireless station (STA) to a plurality of other STAs, e.g., several Access Point (AP) STAs and/or non-AP STAs, for example, to perform trilateration and/or calculate the location of the plurality of STAs.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
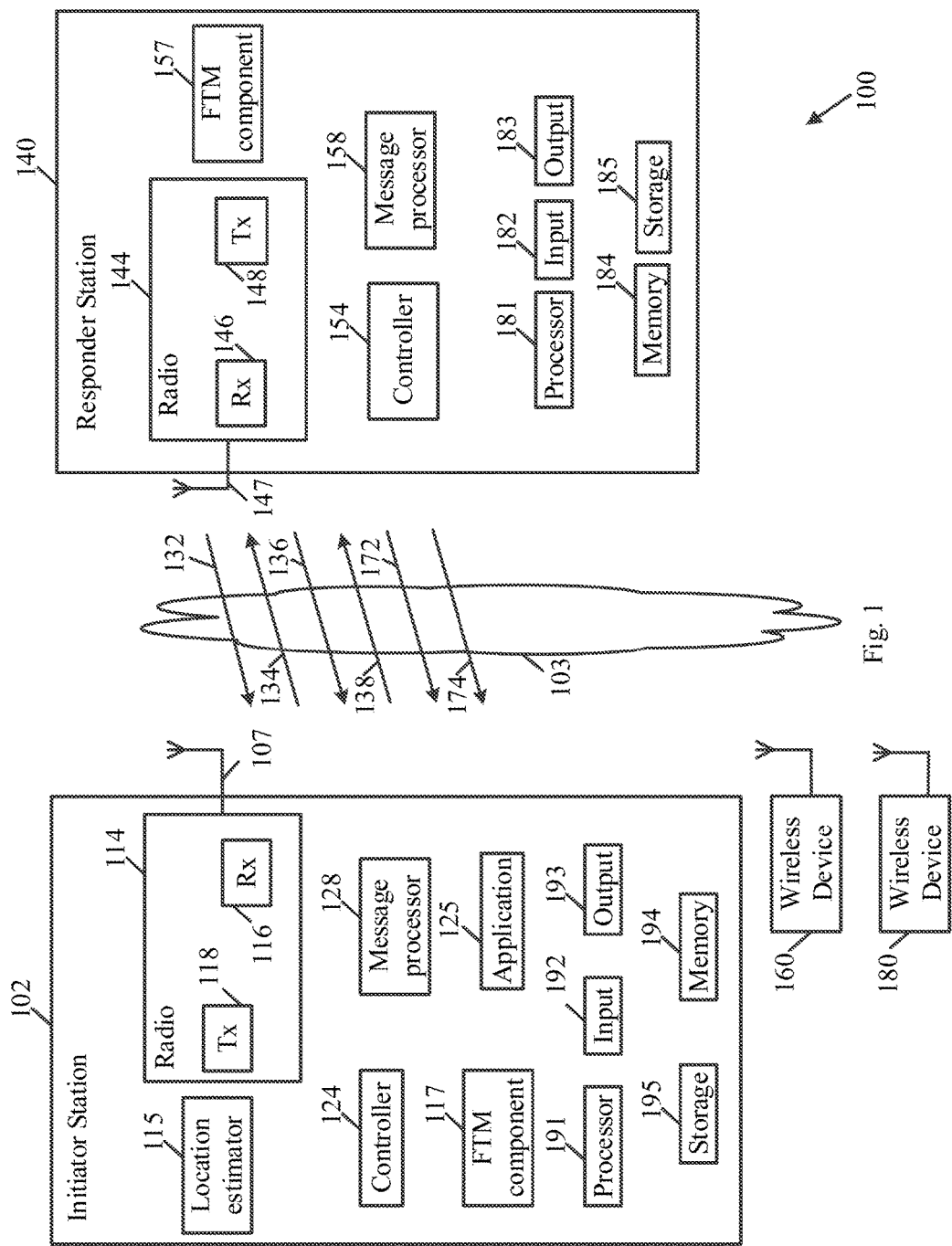
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE 802.11ax (IEEE 802.11ax, High Efficiency WLAN (HEW)); and/or IEEE 802.11az (IEEE 802.11az, Next Generation Positioning)) and/or future versions and/or derivatives thereof, devices and/or networks operating in accordance with existing WiFi Alliance (WFA) Specifications (including Wi-Fi Neighbor Awareness Networking (NAN) Technical Specification, Version 1.0, May 1, 2015) and/or future versions and/or derivatives thereof, devices and/or networks operating in accordance with existing WFA Peer-to-Peer (P2P) specifications (including WiFi P2P technical specification, version 1.5, Aug. 4, 2014) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, device 102 may include at least one STA, and/or device 140 may include at least one STA.

In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more BT devices.

In some demonstrative embodiments, devices 102, 140, 160 and/or 180 may include, operate as, and/or perform the functionality of one or more Neighbor Awareness Networking (NAN) STAs.

In some demonstrative embodiments, one of wireless communication devices 102, 140, 160 and/or 180, e.g., device 140, may include, operate as, and/or perform the functionality of an AP STA, and/or one or more of wireless communication devices 102, 140, 160 and/or 180, e.g., device 102, 160 and/or 180, may include, operate as, and/or perform the functionality of a non-AP STA. In other embodiments, devices 102, 140, 160 and/or 180 may operate as and/or perform the functionality of any other STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired and/or wireless links. In other embodiments, components of one or more of devices 102, 140, 160 and/or 180 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a S1G band, and/or any other frequency band.

In some demonstrative embodiments, devices 102, 140, 160 and/or 180 may include one or more radios to perform wireless communication between devices 102, 140, 160, 180 and/or one or more other wireless communication devices. For example, device 102 may include a radio 114, and/or device 140 may include a radio 144.

In some demonstrative embodiments, devices 102, 140, 160 and/or 180 may include one or more radios including circuitry and/or logic to perform wireless communication between devices 102, 140, 160, 180 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160, 180 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, wireless communication devices 102, 140, 160, and/or 180 may form, or may communicate as part of, a wireless local area network (WLAN).

In some demonstrative embodiments, wireless communication devices 102, 140, 160, and/or 180 may form, or may communicate as part of, a WiFi network.

In other embodiments, wireless communication devices 102, 140, 160, and/or 180 may form, and/or communicate as part of, any other network.

In some demonstrative embodiments, device 140 may include, operate as, and/or perform the functionality of a positioning responder station.

In some demonstrative embodiments, devices 102, 160, and/or 180 may include one or more applications configured to provide and/or to use one or more location based services, e.g., a social application, a navigation application, a location based advertising application, and/or the like. For example, device 102 may include an application 125 to be executed by device 102.

In some demonstrative embodiments, application 125 may use range information between devices 102 and 140, for example, to determine an estimated location of device 102, e.g., with respect to a coordinate system, e.g., a World Geodetic System 1984 (WGS84), and/or a local coordination.

In one example, device 102 may include a Smartphone and device 140 may include an AP, which is located in a shop, e.g., in a shopping mall. According to this example, application 125 may use the range information to determine a relative location of device 102 with respect to device 140, for example, to receive sale offers from the shop.

In another example, device 102 may include a mobile device and device 140 may include a responder station, which is located in a parking zone, e.g., of a shopping mall. According to this example, application 125 may use the range information to determine a location of device 102 in the parking zone, for example, to enable a user of device 102 to find a parking area in the parking zone.

In some demonstrative embodiments, device 102 may include a location estimator 115 configured to estimate a location of device 102, e.g., as described below.

In some demonstrative embodiments, location estimator 115 may be configured to determine a location of device 102, for example, using a plurality of ranges from the plurality of other STAs, e.g., by performing trilateration.

In some demonstrative embodiments, location estimator 115 may include circuitry and/or logic, e.g., processor circuitry and/or logic, memory circuitry and/or logic, and/or any other circuitry and/or logic, configured to perform the functionality of location estimator 115. Additionally or alternatively, one or more functionalities of location estimator 115 may be implemented by logic, which may be executed by a machine and/or one or more processors, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, location estimator 115 may be configured to estimate the location of device 102, for example, based on time based range measurements, for example, with device 140 and/or one or more other devices.

In some demonstrative embodiments, the time based range measurements may be performed using WLAN communications, e.g., WiFi. For example, using WiFi to perform the time based range measurements may enable, for example, increasing an indoor location accuracy of the location estimation of device 102, e.g., in an indoor environment.

In some demonstrative embodiments, the time based range measurements may include a round trip time (RTT) measurement (also referred to as Time of Flight (ToF) procedure).

In some demonstrative embodiments, a ToF value may be defined as the overall time a signal propagates from a first station, e.g., device 102, to a second station, e.g., device 140, and back to the first station. A distance between the first and second stations may be determined based on the ToF value, for example, by dividing the ToF value by two and multiplying the result by the speed of light.

In some demonstrative embodiments, the ToF measurement procedure may include a Fine Timing Measurement (FTM) procedure.

In some demonstrative embodiments, devices 102, 140, 160, and/or 180 may be configured to perform one or more FTM measurements, ToF measurements, positioning measurements and/or communications, ranging measurements and/or communications, proximity measurements and/or communications, location estimation measurements and/or communications.

In some demonstrative embodiments, devices 102, 140, 160, and/or 180 may be configured to perform any other additional or alternative positioning measurements and/or communications, ranging measurements and/or communications, proximity measurements and/or communications, location estimation measurements and/or communications, for example, and/or according to any other additional or alternative procedure and/or protocol, e.g., an Received Signal Strength Indication (RSSI) procedure.

Some demonstrative embodiments are described below with respect to FTM measurements according to an FTM procedure. However, other embodiments may be implemented with respect to any other additional or alternative positioning measurements and/or communications, ranging measurements and/or communications, proximity measurements and/or communications, location estimation measurements and/or communications.

In some demonstrative embodiments, devices 102, 140, 160, and/or 180 may be configured to perform one or more FTM measurements, for example, using WLAN communications, e.g., WiFi. For example, using WiFi to perform time based range measurements, e.g., FTM measurements, may enable, for example, increasing an indoor location accuracy of the mobile devices, e.g., in an indoor environment.

In some demonstrative embodiments, devices 102, 160, and/or 180 may perform the functionality of an initiator device to initiate the FTM protocol, and device 140 may perform the functionality of a responder device. For example, device 140 may include an AP, and/or devices 102, 160, and/or 180 may include a non-AP STA, for example, a mobile device, e.g., a Smartphone, which may initiate the FTM protocol with the AP, for example, to determine a location of the mobile device.

In some demonstrative embodiments, device 102 may include an FTM component 117, and/or device 140 may include an FTM component 157, which may be configured to perform one or more FTM measurements, operations and/or communications, e.g., as described below.

In some demonstrative embodiments, FTM components 117 and/or 157 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of FTM components 117 and/or 157. Additionally or alternatively, one or more functionalities of FTM components 117 and/or 157 may be implemented by logic, which may be executed by a machine and/or one or more processors, e.g., as described below.

In some demonstrative embodiments, FTM component 117 may be configured to perform one or more operations of, and/or at least part of the functionality of, message processor 128 and/or controller 124, for example, to trigger communication of one or more FTM messages and/or NDPs, e.g., as described below.

In some demonstrative embodiments, FTM component 157 may be configured to perform one or more operations of, and/or at least part of the functionality of, message processor 158 and/or controller 154, for example, to trigger communication of one or more FTM messages and/or NDPs, e.g., as described below.

In some demonstrative embodiments, FTM components 117 and/or 157 may be configured to trigger the FTM measurements, for example, periodically and/or or upon a request from an application executed by a device, for example, to determine an accurate location of the device.

In some demonstrative embodiments, FTM components 117 and/or 157 may be configured to perform one or more measurements according to the FTM protocol, e.g., as described below.

In some demonstrative embodiments, FTM components 117 and/or 157 may be configured to perform one or more proximity, ranging, and/or location estimation measurements, e.g., in an indoor location, based on the FTM measurements. For example, the FTM measurements may provide a relatively accurate estimation of location, range and/or proximity, e.g., in an indoor location.

Some demonstrative embodiments are described herein with respect to an FTM component, e.g., FTM components 117 and/or 157, configured to perform measurements according to an FTM protocol and/or procedure. However, in other embodiments, the FTM component may be configured to perform any other additional or alternative type of Time of Flight (ToF) measurements, ranging measurements, positioning measurements, proximity measurements, and/or location estimation measurements, e.g., according to any additional or alternative protocol and/or procedure.

In some demonstrative embodiments, devices 102, 140, 160, and/or 180 may be configured to utilize the FTM Protocol. For example, device 102 may be configured to use the FTM protocol to measure the RTT from a STA implemented by device 102 to a plurality of other STAs, e.g., including device 140, for example, including one or more AP STAs and/or non-AP STAs.

In some demonstrative embodiments, the FTM protocol may be implemented as part of a Specification or protocol, for example, an IEEE 802.11 Specification, for example, by a task group dealing with WiFi positioning, e.g., IEEE 802.11az—Next Generation Positioning.

In some demonstrative embodiments, the FTM protocol may be configured to enable providing, for example, at least improved capacity, support of high density environments, improved scalability, improved accuracy, and/or one or more additional or alternative advantages, and/or benefits.

In some demonstrative embodiments, devices 102, 140, 160, and/or 180 may be configured to utilize a MU FTM Protocol, e.g. as described below.

In some demonstrative embodiments, the FTM protocol may be configured to support Multi-User (MU) capabilities, for example, in accordance with a Specification or protocol, for example, an IEEE 802.11 Specification, for example, an IEEE 802.11ax Specification. In one example, a MU FTM protocol, e.g., as described herein, may allow merging between a multi user managing protocol, e.g., in accordance with an IEEE 802.11ax Specification, and advanced FTM measurement for positioning. For example, an IEEE 802.11ax Specification may be focused on data transfer for multi-users, mostly for associated STAs.

In some demonstrative embodiments, the MU FTM protocol may utilize an improved air interface while allowing denser environment than before, e.g., compared to current IEEE 802.11 Specifications. For example, positioning capabilities may be combined with WiFi services, for example, while allowing a network to control the quality of service and/or the level of effect on other services.

In some demonstrative embodiments, the MU FTM protocol may utilize advanced multi user capabilities, for example, while offering positioning measurements, e.g., FTM range measurements, to multiple users.

In some demonstrative embodiments, the MU FTM protocol may be configured to provide, for example, good positioning measurement results, for example, while keeping an efficient air-interface management by an AP or responder, e.g., as described below.

In some demonstrative embodiments, the MU FTM protocol may implement a time division approach, for example, to allow utilizing an increased, e.g., full, bandwidth (BW) for sounding a plurality of STAs, e.g., all STAs.

In some demonstrative embodiments, an AP or responder device, e.g., device 140, may be configured to solicit a plurality of STAs, e.g., devices 102, 160, and/or 180, to perform positioning measurements, e.g., as described below.

In some demonstrative embodiments, one or more STAs, e.g., devices 102, 160, and/or 180, may respond to the AP, for example, if they are interested in performing a measurement with the AP, e.g., as described below.

In some demonstrative embodiments, the AP and the one or more STAs may perform a measurement sequence, e.g., commencing immediately after the responses from the STAs, e.g., as described below.

In some demonstrative embodiments, one or more operations of a MU FTM procedure, e.g., the whole procedure, may be performed in one atomic operation, for example, one Transit Opportunity (TxOp), and/or with a duration of a Short Inter-Frame Space (SIFS) between frames, e.g., as described below.

In some demonstrative embodiments, the MU FTM protocol may be configured, for example, to allow un-associated multi-user positioning measurements, e.g., as described below.

In some demonstrative embodiments, the MU FTM protocol described herein may be configured, for example, to address at least a near-far technical problem, which may be more prominent in a positioning use-case, for example, since the positioning use case may involve unassociated STAs communicating with multiple APs/responders.

In some demonstrative embodiments, the MU FTM protocol may provide a solution for performing positioning measurements in a multi-user scenario, for example, in contrast to existing protocols, which may not be managed for multi user implementations. For example, a protocol, e.g., in accordance with an IEEE 802.11RevMC Standard, may be configured for one user at a time, and may not be able to utilize an air interface in an efficient manner.

In some demonstrative embodiments, an AP, for example, device 140, may be configured to manage a WiFi air interface. For example, the AP, e.g., device 140, may be configured to control which STA, e.g., devices 102, 160, and/or 180, transmits and when, and/or may allocate BW resources, e.g., by resource units (RUs), for example, for better utilization of available air resources, e.g., as described below.

In some demonstrative embodiments, the AP, e.g., device 140, may be configured to schedule uplink communications from the plurality of STAs, e.g., devices 102, 160, and/or 180, according to an uplink procedure, e.g., in accordance with an IEEE 802.11ax Specification.

In some demonstrative embodiments, the AP may be configured to solicit STAs to upload data by a periodical Random Access Trigger Frame (RTF). The AP may define in the RTF, which RUs are to be allocated for random access and for non-random access, e.g., as may be indicated by a dedicated Association Identifier (AID). A STA, e.g., devices 102, 160, and/or 180, may respond to the RTF, and the AP may reply with a block-ack (BA) and another trigger (non-random access) indicating an allocation of resources for which STA. The STAs may then upload all their data. The protocol may end with a multi block acknowledge (MB-A)

In some demonstrative embodiments, FTM component 157 may be configured to control, cause and/or trigger device 140 to transmit a trigger frame 136 to a plurality of wireless stations, e.g. devices 102, 160 and/or 180.

In one example, message processor 158 may generate trigger frame 136, and/or transmitter 148 may transmit trigger frame 136 to devices 102, 160 and/or 180.

In some demonstrative embodiments, FTM component 157 may be configured to include in trigger frame 136 a resource allocation of a plurality of resource slots to the plurality of wireless stations, e.g., devices 102, 160 and/or 180.

In some demonstrative embodiments, FTM component 157 may be configured to include in the resource allocation a Time Division Duplexing (TDD) allocation of a plurality of time slots.

In some demonstrative embodiments, the plurality of wireless stations, e.g., devices 102, 160 and/or 180, may receive trigger frame 136 from device 140, e.g., as described below.

In some demonstrative embodiments, FTM component 117 may be configured to control, cause and/or trigger device 102 to process trigger frame 136 from device 140.

In one example, receiver 116 may receive trigger frame 136 from device 140, and/or message processor 128 may be configured to access, process, and/or decode trigger frame 136.

In some demonstrative embodiments, the plurality of wireless stations, e.g., devices 102, 160 and/or 180, may transmit a plurality of NDP transmissions 138 to device 140, according to the resource allocation, e.g., as described below.

In some demonstrative embodiments, FTM component 117 may be configured to control, cause and/or trigger device 102 to transmit an NDP transmission to device 140 according to the resource allocation, e.g., in response to trigger frame 136.

In one example, message processor 128 may generate the NDP transmission, and/or transmitter 118 may transmit the NDP transmission to device 140 according to the resource allocation.

In some demonstrative embodiments, device 140 may receive the plurality of NDP transmissions 138 from the plurality of wireless stations, e.g., devices 102, 160 and/or 180, e.g., as described below.

In some demonstrative embodiments, FTM component 157 may be configured to control, cause and/or trigger device 140 to process the plurality of NDP transmissions 138 from the plurality of wireless stations, e.g., devices 102, 160 and/or 180.

In one example, receiver 146 may receive the plurality of NDP transmissions 138 from devices 102, 160 and/or 180, and/or message processor 158 may be configured to access, process, and/or decode the plurality of NDP transmissions 138.

In some demonstrative embodiments, the plurality of wireless stations, e.g., devices 102, 160 and/or 180, may transmit a sequence of two or more NDPs including two or more respective NDP transmissions of the plurality of NDP transmissions 138 to device 140, e.g., as described below.

In some demonstrative embodiments, the two or more NDPs of the plurality of NDP transmissions 138 may include at least first and second NDPs, e.g., from devices 102 and 160, which may be, for example, separated from one another, e.g., by a SIFS.

In some demonstrative embodiments, FTM component 117 may be configured to control, cause and/or trigger device 102 to transmit an NDP including the NDP transmission.

In one example, message processor 128 may generate the NDP including the NDP transmission and/or transmitter 118 may transmit the NDP to device 140.

In some demonstrative embodiments, device 140 may receive from the plurality of wireless stations, e.g., devices 102, 160 and/or 180, the sequence of two or more NDPs including the two or more respective NDP transmissions of the plurality of NDP transmissions 138, e.g., as described below.

In some demonstrative embodiments, FTM component 157 may be configured to control, cause and/or trigger device 140 to process a sequence of two or more NDPs including the two or more respective NDP transmissions of the plurality of NDP transmissions 138.

In one example, receiver 146 may receive the sequence of two or more NDPs including the two or more respective NDP transmissions of the plurality of NDP transmissions 138, and/or message processor 158 may be configured to access, process, and/or decode the sequence of the two or more NDPs.

In some demonstrative embodiments, the plurality of wireless stations, e.g., devices 102, 160 and/or 180, may transmit two or more NDP transmissions of the plurality of NDP transmissions 138 to device 140 as part of a MU NDP, e.g., as described below.

In some demonstrative embodiments, FTM component 117 may be configured to control, cause and/or trigger device 102 to transmit the NDP transmission as part of a MU NDP.

In one example, message processor 128 may generate the NDP transmission as part of a MU NDP, and/or transmitter 118 may transmit the NDP transmission as part of a MU NDP to device 140.

In some demonstrative embodiments, device 140 may receive at least one MU NDP, including two or more NDP transmissions from two or more wireless stations, e.g., devices 102, 160 and/or 180, e.g., as described below.

In some demonstrative embodiments, FTM component 157 may be configured to control, cause and/or trigger device 140 to process at least one MU NDP, including two or more NDP transmissions from two or more wireless stations of the plurality of wireless stations, e.g., devices 102, 160 and/or 180.

In one example, receiver 146 may receive a MU NDP including two or more NDP transmissions from devices 102, 160 and/or 180, and/or message processor 158 may be configured to access, process, and/or decode the MU NDP.

In some demonstrative embodiments, the MU NDP may include a MU NDP header from the two or more wireless stations, e.g. from devices 102, 160 and/or 180, followed by a sequence of two or more channel sounding transmissions from the two or more wireless stations, e.g., from devices 102, 160 and/or 180.

In some demonstrative embodiments, FTM component 117 may be configured to control, cause and/or trigger device 102 to transmit a MU NDP header followed by a channel sounding transmission, as part of the MU NDP.

In one example, message processor 128 may generate the MU NDP header and the channel sounding transmission, and/or transmitter 118 may transmit the MU NDP header and the channel sounding transmission to device 140 as part of a MU NDP.

In some demonstrative embodiments, the resource allocation in trigger frame 136 may include an allocation of two or more time slots for the two or more channel sounding transmissions from the two or more wireless stations, e.g. from devices 102, 160 and/or 180.

In some demonstrative embodiments, a channel sounding transmission from a station may include a plurality of channel sounding symbols from a plurality of antennas of the station. In one example, the channel sounding transmission from the station may include a sequence of channel sounding symbols, e.g., at least one channel sounding symbol per antenna.

In some demonstrative embodiments, the channel sounding symbols may include a plurality of long training fields from the plurality of respective antennas of the station.

In some demonstrative embodiments, the channel sounding transmission may include a short training field prior to the plurality of channel sounding symbols.

In some demonstrative embodiments, the plurality of wireless stations, e.g., devices 102, 160 and/or 180, may transmit the MU NDP headers and the channel sounding transmissions over a same frequency band to device 140, e.g., as described below.

In some demonstrative embodiments, FTM component 117 may be configured to control, cause and/or trigger device 102 to transmit the MU NDP header and the channel sounding transmission over the same frequency band.

In one example, message processor 128 may generate the MU NDP header and the channel sounding transmission, and/or transmitter 118 may transmit the MU NDP header and the channel sounding transmission over the same frequency band, e.g., to device 140.

In some demonstrative embodiments, device 140 may receive the MU NDP headers and the channel sounding transmissions from the plurality of wireless stations, e.g., devices 102, 160 and/or 180, over the same frequency bandwidth, e.g., as described below.

In some demonstrative embodiments, FTM component 157 may be configured to control, cause and/or trigger device 140 to process the MU NDP header from device 102 and a channel sounding symbol of the plurality of channel sounding symbols from device 102 over the same frequency bandwidth.

In one example, receiver 146 may receive the MU NDP header and the channel sounding symbol from device 102 over the same frequency bandwidth, and/or message processor 158 may be configured to access, process, and/or decode the MU NDP header and the channel sounding symbol.

In some demonstrative embodiments, device 140 may receive a sequence of a plurality of MU NDPs from a respective plurality of groups of two or more wireless stations, e.g., a group of the plurality of groups may include two or more of devices 102, 160 and/or 180, e.g., as described below.

In some demonstrative embodiments, FTM component 157 may be configured to control, cause and/or trigger device 140 to process the sequence of the plurality of MU NDPs from the respective plurality of groups of two or more wireless stations.

In one example, receiver 146 may receive the sequence of the plurality of MU NDPs from the respective plurality of groups of two or more wireless stations, and/or message processor 158 may be configured to access, process, and/or decode the sequence of the plurality of MU NDPs.

In some demonstrative embodiments, FTM component 157 may be configured to control, cause and/or trigger device 140 to transmit a NDP 172 to the plurality of wireless stations, e.g., devices 102, 160 and/or 180, for example, in response to the plurality of NDP transmissions 138.

In one example, message processor 158 may generate NDP 172, and/or transmitter 148 may transmit NDP 172 to devices 102, 160 and/or 180.

In some demonstrative embodiments, the plurality of wireless stations, e.g., devices 102, 160 and/or 180, may receive NDP 172 from device 140, e.g., as described below.

In some demonstrative embodiments, FTM component 117 may be configured to control, cause and/or trigger device 102 to process NDP 172 from device 140.

In one example, receiver 116 may receive NDP 172 from device 140, and/or message processor 128 may be configured to access, process, and/or decode NDP 172.

In some demonstrative embodiments, device 140 may transmit a MU FTM message 174 to the plurality of wireless stations, e.g., devices 102, 160 and/or 180, e.g., as described below.

In some demonstrative embodiments, FTM component 157 may be configured to control, cause and/or trigger device 140 to transmit a MU FTM message 174 to the plurality of wireless stations, e.g., devices 102, 160 and/or 180.

In one example, message processor 158 may generate MU FTM message 174, and/or transmitter 148 may transmit MU FTM message 174 to the plurality of wireless stations, e.g., devices 102, 160 and/or 180.

In some demonstrative embodiments, FTM component 157 may be configured to include in MU FTM message 174 channel information corresponding to the plurality of NDP transmissions 138.

In some demonstrative embodiments, FTM component 157 may be configured to include in MU FTM message 174 timing information corresponding to NDP 172 and/or timing information corresponding to the plurality of NDP transmissions 138.

In some demonstrative embodiments, FTM component 157 may be configured to include in MU FTM message 174 a plurality of Time of Arrival (ToA) values corresponding to the plurality of NDP transmissions 138 and/or a Time of Departure (ToD) value corresponding to NDP 172.

In some demonstrative embodiments, the plurality of wireless stations, e.g., devices 102, 160 and/or 180, may receive MU FTM message 174 from device 140, e.g., as described below.

In some demonstrative embodiments, FTM component 117 may be configured to control, cause and/or trigger device 102 to process MU FTM message 174 from device 140.

In one example, receiver 116 may receive MU FTM message 174 from device 140, and/or message processor 128 may be configured to access, process, and/or decode MU FTM message 174.

In some demonstrative embodiments, FTM component 157 may be configured to control, cause and/or trigger device 140 to transmit a positioning trigger message 132 to the plurality of wireless stations, e.g., devices 102, 160 and/or 180, for example, prior to trigger frame 136.

In one example, message processor 158 may generate positioning trigger message 132 and/or transmitter 148 may transmit positioning trigger message 132 to the plurality of wireless stations, e.g., devices 102, 160 and/or 180.

In some demonstrative embodiments, FTM component 157 may be configured to control, cause and/or trigger device 140 to include in positioning trigger message 132 a Random Access Trigger Frame (RTF).

In some demonstrative embodiments, the plurality of wireless stations, e.g., devices 102, 160 and/or 180, may receive positioning trigger message 132 from device 140, e.g., as described below.

In some demonstrative embodiments, FTM component 117 may be configured to control, cause and/or trigger device 102 to process positioning trigger message 132 from device 140.

In one example, receiver 116 may receive positioning trigger message 132, and/or message processor 128 may be configured to access, process, and/or decode positioning trigger message 132.

In some demonstrative embodiments, the plurality of wireless stations, e.g., devices 102, 160 and/or 180, may transmit a plurality of FTM requests 134 to device 140, e.g., in response to positioning trigger message 132.

In some demonstrative embodiments, FTM component 117 may be configured to control, cause and/or trigger device 102 to transmit a FTM request to device 140.

In one example, message processor 128 may generate the FTM request and/or transmitter 118 may transmit the FTM request to device 140.

In some demonstrative embodiments, device 140 may receive the plurality of FTM requests 134 from the plurality of wireless stations, e.g., devices 102, 160 and/or 180.

In one example, receiver 146 may receive the plurality of FTM requests 134 and/or message processor 158 may be configured to access, process, and/or decode the plurality of FTM requests 134.

In some demonstrative embodiments, device 140 may transmit to the plurality of wireless stations, e.g., devices 102, 160 and/or 180, a MU acknowledgement message to acknowledge the plurality of FTM requests 134 e.g., in response to the plurality of FTM requests 134.

In some demonstrative embodiments, FTM component 157 may be configured to control, cause and/or trigger device 140 to transmit the MU acknowledgement message to the plurality of wireless stations, e.g., devices 102, 160 and/or 180.

In one example, message processor 158 may generate the MU acknowledgement message and/or transmitter 148 may transmit the MU acknowledgement message to the plurality of wireless stations, e.g., devices 102, 160 and/or 180.

In some demonstrative embodiments, the plurality of wireless stations, e.g., devices 102, 160 and/or 180, may receive the MU acknowledgement message, acknowledging the plurality of FTM requests 134, from device 140, e.g., as described below.

In some demonstrative embodiments, FTM component 117 may be configured to control, cause and/or trigger device 102 to process the MU acknowledgement message from device 140.

In one example, receiver 116 may receive the MU acknowledgement message, and/or message processor 128 may be configured to access, process, and/or decode the MU acknowledgement message.

In some demonstrative embodiments, trigger frame 136 may be based at least on the plurality of FTM requests 134, and/or MU FTM message 174 may include a MU FTM response, e.g., as described below.

In some demonstrative embodiments, FTM component 157 may be configured to control, cause and/or trigger device 140 to transmit NDP 172, e.g., as described above, subsequent to the reception of the plurality of FTM requests 134 and prior to trigger frame 136.

In some demonstrative embodiments, the plurality of wireless stations, e.g., devices 102, 160 and/or 180, may receive NDP 172 from device 140, subsequent to the transmission of the plurality of FTM requests 134 and prior to trigger frame 136, e.g., as described below.

In some demonstrative embodiments, FTM component 117 may be configured to control, cause and/or trigger device 102 to process NDP 172 from device 140 subsequent to the transmission of the FTM request and prior to trigger frame 136.

In some demonstrative embodiments, FTM component 157 may be configured to control, cause and/or trigger device 140 to transmit NDP 172, e.g., as described above, subsequent to the reception of the plurality of NDP transmissions 138.

In some demonstrative embodiments, the plurality of wireless stations, e.g., devices 102, 160 and/or 180, may receive NDP 172 from device 140, subsequent to the transmission of the plurality of NDP transmissions 138, e.g., as described below.

In some demonstrative embodiments, FTM component 117 may be configured to control, cause and/or trigger device 102 to process NDP 172 from device 140 subsequent to the transmission of the NDP transmission.

Figure 2:
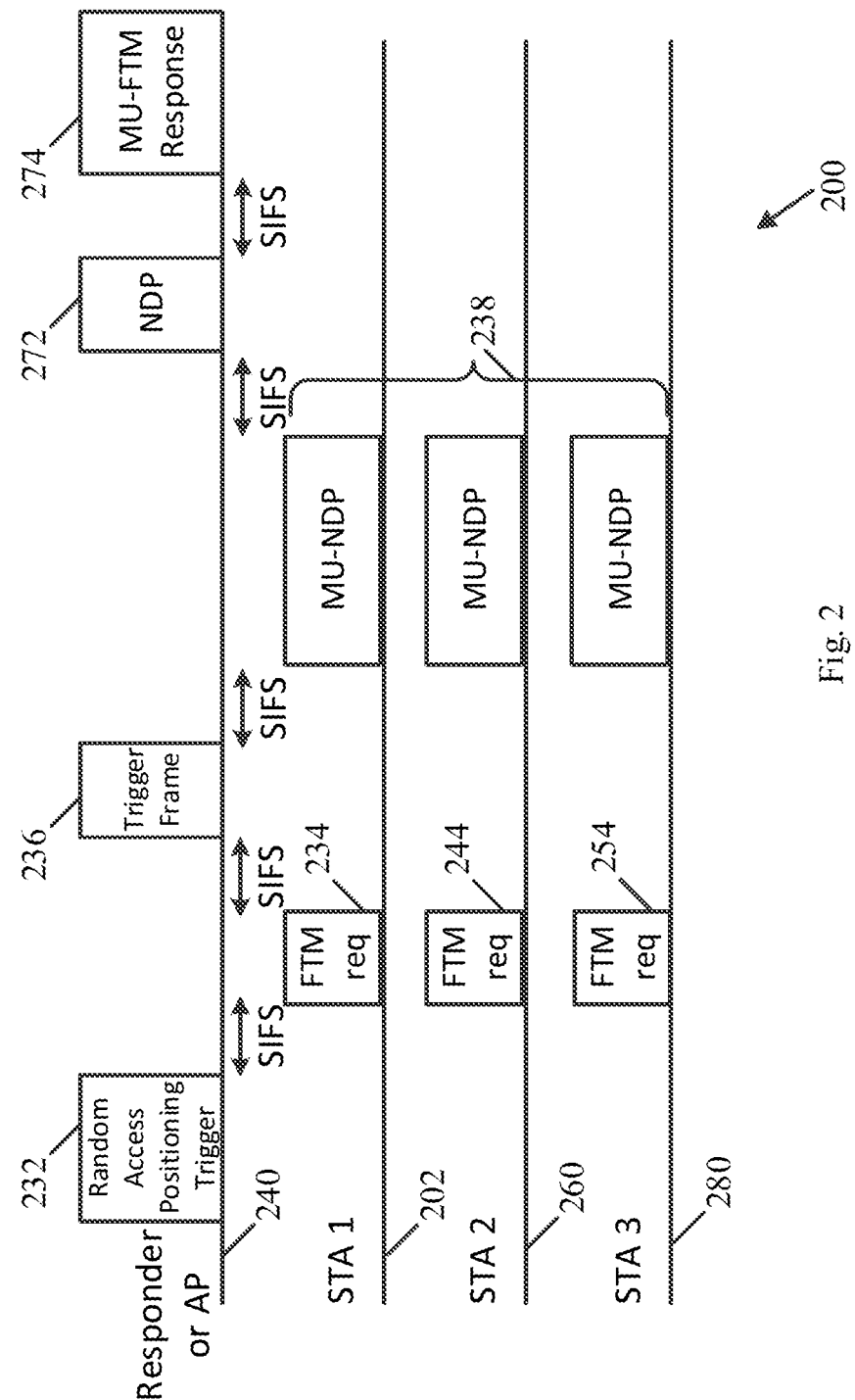
FIG. 2 is a schematic illustration of a Multi User (MU) Fine Timing Measurement (FTM) Protocol, in accordance with some demonstrative embodiments.

Reference is made to FIG. 2, which schematically illustrates a MU FTM Protocol 200 between a wireless communication STA 240, and a plurality of wireless communication STAs, e.g., STAs 202, 260, and/or 280, in accordance with some demonstrative embodiments. For example, STA 240 may perform the functionality of device 140 (FIG. 1); and/or STAs 202, 260, and/or 280 may perform the functionality of devices 102, 160 and/or 180 (FIG. 1), respectively.

In some demonstrative embodiments, as shown in FIG. 2, the MU FTM procedure may begin with STA 240 sending a positioning trigger frame 232, to ask who wants to perform a positioning measurement. For example, positioning trigger frame 232 may include positioning trigger message 132 (FIG. 1).

In some demonstrative embodiments, positioning trigger frame 232 may include a RTF.

In some demonstrative embodiments, positioning trigger frame 232 may include a dedicated positioning RTF, which may be reserved, for example, for positioning only.

In some demonstrative embodiments, positioning trigger frame 232 may use a dedicated AID for random access positioning in conjunction with an AID for associated STAs, for example, to solicit specific STAs, e.g., STAs 202, 260, and/or 280, to perform a positioning measurement.

In some demonstrative embodiments, positioning trigger frame 232 may include the schedule information for one or more following RTFs.

In some demonstrative embodiments, an RTF schedule indicating a schedule of one or more RTF frames may be included in a beacon frame.

In some demonstrative embodiments, as shown in FIG. 2, one or more STAs, e.g., STAs 202, 260, and/or 280, may respond to positioning trigger frame 232, for example, using a dedicated positioning set of OFDMA Back Off (OBO) and/or OFDMA Contention Window (OCW) mechanisms, e.g., in accordance with an IEEE 802.11ax Specification.

In some demonstrative embodiments, STAs 202, 260, and/or 280 may transmit the response to positioning trigger frame 232 in the form of an FTM request, e.g., FTM requests 234, 244 and/or 254. For example, FTM requests 234, 244 and/or 254 may include the plurality of FTM requests 134 (FIG. 1).

In some demonstrative embodiments, a STA, e.g., STA 202, may be configured to include in the FTM request, e.g., FTM request 234, information relating to a Number of Transmit (Tx) antennas of the STA, a BW, a Token (measurement ID), a Previous measurement (optional), and/or any other additional or alternative information.

In some demonstrative embodiments, STA 240 may process the FTM requests, e.g., FTM requests 234, 244 and/or 254, and may send to STAs 202, 260, and/or 280 a trigger frame 236, which may be configured by STA 240 to specify an allocation for a request, e.g., FTM requests 234, 244 and/or 254, if accepted. For example, trigger frame 236 may include trigger frame 136 (FIG. 1).

In some demonstrative embodiments, trigger frame 236 may include details of allocation for the requests, e.g., FTM requests 234, 244 and/or 254, for example, including one or more of a Time slot (or slots) for each request, frequency resources for each request, Tx power guidelines, a Number of responder Tx antennas, and/or any other additional or alternative information.

In some demonstrative embodiments, as shown in FIG. 2, a measurement may begin, for example, with STAs 202, 260, and/or 280 sending Multi User (MU) Non Data Packet (NDP) 238, e.g., simultaneously, for example, while each STA may only occupy its designated resource, e.g., as allocated by the trigger frame 236. For example, MU NDP 238 may include the plurality of NDP transmissions 138 (FIG. 1).

In some demonstrative embodiments, MU-NDP 238 may include OFDM symbols as reference symbols, e.g., similar to an NDP.

In some demonstrative embodiments, a STA, e.g. STAs 202, 260, and/or 280, may send one or more OFDM symbols, for example, from one or more respective Tx antennas.

In some demonstrative embodiments, Hadamard multiplexing may be used within each STA antenna sounding, e.g., similar to a single user NDP.

In some demonstrative embodiments, it may be possible to use Hadamard multiplexing for all stations together.

In some demonstrative embodiments, an entire available frequency BW, e.g., an entire bandwidth of a channel, may be used for sounding, for example, in order to provide improved, e.g., beset, positioning performance, e.g., as described below.

In some demonstrative embodiments, a TDD approach, e.g., including allocating a plurality of time slots to the respective plurality of stations, may be implemented, for example, to utilize an entire BW for sounding, e.g., in contrast to a RU approach.

Figure 3:
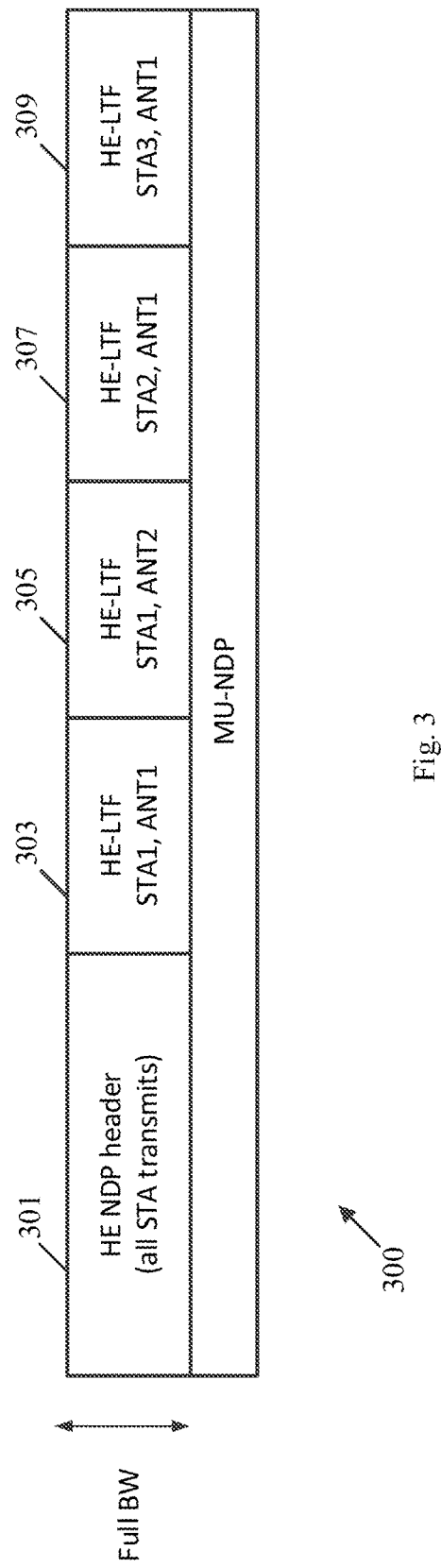
FIG. 3 is a schematic illustration of an MU Non-Data-Packet (NDP), in accordance with some demonstrative embodiments.

Reference is made to FIG. 3, which schematically illustrates a MU NDP 300, in accordance with some demonstrative embodiments. For example, MU NDP 238 (FIG. 2) may include MU NDP 300.

In some demonstrative embodiments, MU NDP 300 may include two or more NDP transmissions from two or more wireless stations, e.g., devices 102, 160 and/or 180 (FIG. 1), e.g., as described above.

In some demonstrative embodiments, the NDP transmissions may include a MU NDP header 301 from two or more wireless stations, e.g. from devices 102, 160 and/or 180 (FIG. 1)

For example, as shown in FIG. 3, devices 102, 160 and/or 180 (FIG. 1) may send, e.g., simultaneously, a MU NDP header 301, e.g., including a frame legacy preamble.

In some demonstrative embodiments, the header 301, e.g., including the frame legacy preamble, may be followed by a sequence of two or more channel sounding transmissions from the two or more wireless stations, e.g., from devices 102, 160 and/or 180 (FIG. 1).

For example, as shown in FIG. 3, device 102 (FIG. 1) may send two OFDM symbols, e.g., one form each antenna, e.g., channel sounding transmissions 303 and 305, then device 160 (FIG. 1) may send one OFDM symbol for one Tx antenna, e.g., channel sounding transmission 307, and/or then device 180 (FIG. 1) may send one OFDM symbol for one Tx antenna, e.g., channel sounding transmission 309.

In some demonstrative embodiments, the resource allocation for the two or more wireless stations may include an allocation of two or more time slots for the two or more channel sounding transmissions from the two or more wireless stations, e.g. from devices 102, 160 and/or 180 (FIG. 1).

For example, as shown in FIG. 3, the resource allocation may include an allocation of four time slots for the four channel sounding transmissions, e.g., transmissions 303, 305, 307 and 309 from devices 102, 160 and/or 180 (FIG. 1).

In some demonstrative embodiments, the channel sounding transmissions, e.g., transmissions 303, 305, 307 and/or 309, may each include one or more OFDM channel sounding symbols from one or more respective antennas, e.g., as described above.

In some demonstrative embodiments, the OFDM symbols may include a plurality of long training fields (LTFs).

In some demonstrative embodiments, the TDD allocation of the OFDM symbols to devices 102, 160 and/or 180 (FIG. 1), e.g., as shown in FIG. 3, may be very efficient, e.g., with respect to a number of users per second.

For example, the allocation of FIG. 3 may utilize a duration of an OFDM symbol length, e.g., 4 us, per user per Tx antenna. Accordingly, the TDD allocation may provide a fast measurement sequence, which may allow, for example, ignoring a clock frequency drift between device 140 (FIG. 1) and devices 102, 160 and/or 180 (FIG. 1).

In some demonstrative embodiments, the plurality of wireless stations, e.g., devices 102, 160 and/or 180 (FIG. 1), may transmit the MU NDP headers 301 and the channel sounding transmissions over a same frequency band, e.g., as described below.

For example, as shown in FIG. 3, device 102 (FIG. 1) may send frame legacy preamble 301 and channel sounding transmissions 303 and 305 over a same frequency band, device 160 (FIG. 1) may send frame legacy preamble 301 and channel sounding transmission 307 over a same frequency band, and device 180 (FIG. 1) may send frame legacy preamble 301 and channel sounding transmission 309 over a same frequency band.

In some demonstrative embodiments, one or more additional STAs may be supported, for example, by allocating one or more OFDM symbols in the packet.

In some demonstrative embodiments, device 140 (FIG. 1) may be configured to process the sounding transmissions of MU NDP packet 300 in a serial manner, for example, by calculating a ToA for an OFDM, e.g., each symbol per user (per antenna), e.g., of OFDM transmissions 303, 305, 307 and 309.

In some demonstrative embodiments, an additional High Efficiency Short Training Field (HE-STF) may be sent from each STA separately, for example, to allow device 140 (FIG. 1) to setup at least an Automatic Gain Control (AGC), e.g., prior to the measurement, e.g., as described below. For example, using the HE-STF may address at least a near-far problem.

Figure 4:
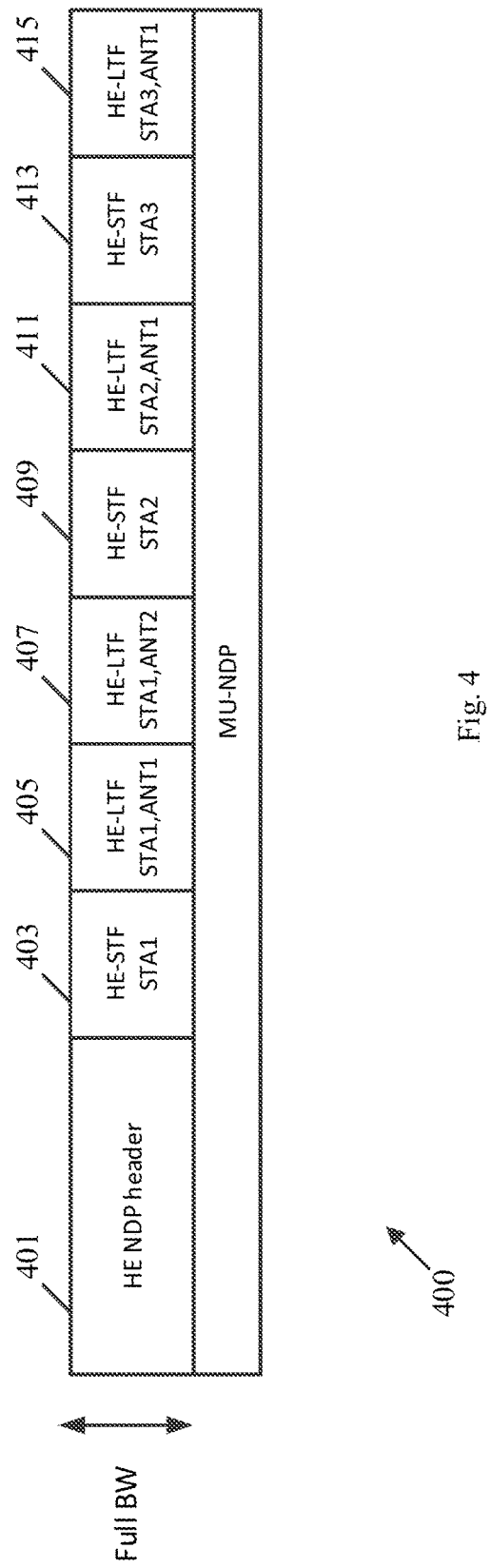
FIG. 4 is a schematic illustration of an MU NDP, in accordance with some demonstrative embodiments.

Reference is made to FIG. 4, which schematically illustrates a MU NDP 400, in accordance with some demonstrative embodiments. For example, MU NDP 238 (FIG. 2) may include MU NDP 400.

In some demonstrative embodiments, as shown in FIG. 4, MU NDP 400 may include an HE-STF transmission, which may be transmitted by a STA, for example, before the STA transmits one or more OFDM symbols.

For example, as shown in FIG. 4, STA 202 (FIG. 2) may transmit a channel sounding transmission including HE-STF transmission 403, which may be transmitted before STA 202 (FIG. 2) transmits channel sounding symbols 405 and 407. For example, STA 260 (FIG. 2) may transmit a channel sounding transmission including HE-STF transmission 409, which may be transmitted before STA 260 (FIG. 2) transmits channel sounding symbol 411. For example, STA 280 (FIG. 2) may transmit a channel sounding transmission including HE-STF transmission 413, which may be transmitted before STA 280 (FIG. 2) transmits channel sounding symbol 415.

Referring back to FIG. 2, in some demonstrative embodiments, for example, after MU-NDP 238, STA 240 may send an NDP, e.g., a High Efficiency (HE) NDP (HE-NDP) frame 272, for example, to allow STAs 202, 260, and/or 280 to receive NDP 272, e.g., together, to estimate the channel impulse response, and/or to measure the ToA for the NDP frame 272. STAs 202, 260, and/or 280 may use the ToA of NDP frame 272 and/or the ToD of MU-NDP 238, for example, for performing a ToF measurement, e.g., for calculating the RTT. For example, NDP 172 (FIG. 1) may include NDP 272.

In some demonstrative embodiments, as shown in FIG. 2, STA 240 may send a MU-FTM response 274, which may include, for example, one or more measurements, which may enable STAs 202, 260, and/or 280 to complete an RTT calculation. For example, MU-FTM response 274 may include MU FTM message 174 (FIG. 1).

In some demonstrative embodiments, MU-FTM response 274 may include timing information indicative of the ToD of NDP 272 sent from STA 240, and/or timing information indicative of the ToA of one or more symbols, e.g., each of the symbols, received within the MU-NDP with, optionally, an observed channel for the symbol.

For example, MU-FTM response 274 may include timing information indicative of a ToA of the one or more OFDM symbols of the MU-NDP, e.g., OFDM symbols 301, 303, 305, 307 and/or 309 (FIG. 3), and/or a ToD of NDP 272 sent by STA 240.

In some demonstrative embodiments, STA 240 may be configured to broadcast MU-FTM response 274 to STAs 202, 260, and/or 280.

In some demonstrative embodiments, STA 240 may be configured to send MU-FTM response 274 in an MU Downlink (MU-DL) mode, or separately to each station, e.g., in a staggered manner.

In some demonstrative embodiments, an order of at least some of the frames in MU FTM protocol 200 (FIG. 2) may be modified, e.g., as described below.

Figure 5:
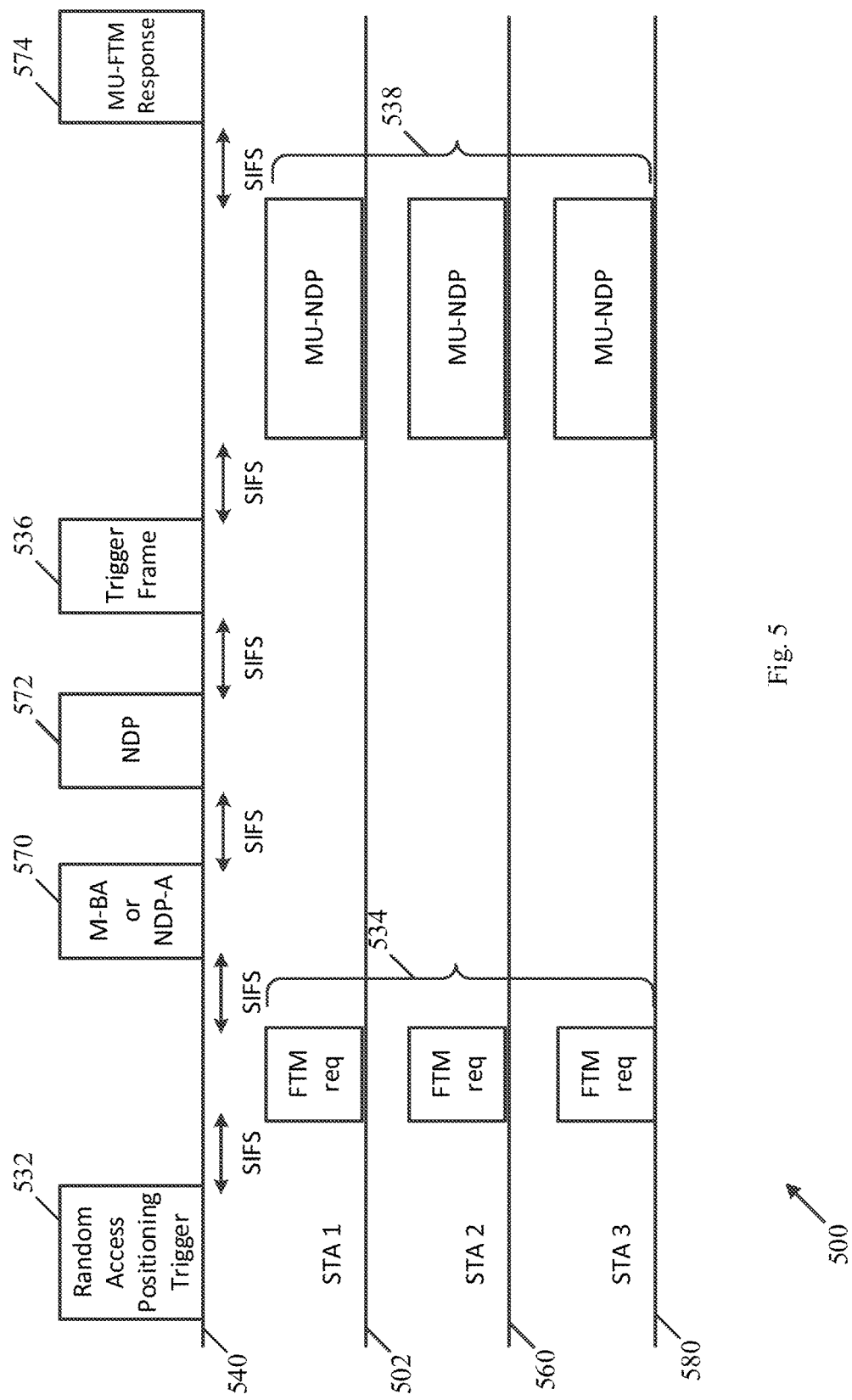
FIG. 5 is a schematic illustration of an MU FTM protocol, in accordance with some demonstrative embodiments.

Reference is made to FIG. 5, which schematically illustrates a MU FTM protocol 500 between a wireless communication STA 540 and a plurality of wireless communication STAs, e.g., STAs 502, 560, and/or 580, in accordance with some demonstrative embodiments. For example, STA 540 may perform the functionality of device 140 (FIG. 1); and/or STAs 502, 560, and/or 580 may perform the functionality of devices 102, 160, and/or 180 (FIG. 1), respectively.

In some demonstrative embodiments, STA 540 may be configured to transmit a NDP 572, for example, prior to the communication of a MU-NDP 538 from STAs 502, 560 and/or 580 to STA 540. For example, NDP 172 (FIG. 1) may include NDP 572, and/or MU-NDP 538 may include MU NDP 300 (FIG. 3) or MU NDP 400 (FIG. 4).

In some demonstrative embodiments, STA 540 may transmit a Random Access Positioning Trigger 532 to the plurality of wireless stations, e.g., STAs 502, 560, and/or 580. For example, Random Access Positioning Trigger 532 may include positioning trigger message 132 (FIG. 1).

In some demonstrative embodiments, the plurality of wireless stations, e.g., STAs 502, 560, and/or 580 may transmit a plurality of FTM requests 534 to STA 540, e.g., in response to Random Access Positioning Trigger 532, e.g., as described above. For example, the plurality of FTM requests 534 may include the plurality of FTM requests 134 (FIG. 1).

In some demonstrative embodiments, STA 540 may transmit a MU BA (M-BA) 570 or a NDP Acknowledgement (NDP-A) 570 to the plurality of wireless stations, e.g., STAs 502, 560, and/or 580, for example, to acknowledge the plurality of FTM requests 534, e.g., as described above.

In some demonstrative embodiments, STA 540 may transmit the NDP 572 to the plurality of wireless stations, e.g., STAs 502, 560, and/or 580, for example, subsequent to M-BA/NDP-A 570.

In some demonstrative embodiments, STA 540 may transmit a Trigger Frame 536 to the plurality of wireless stations, e.g., STAs 502, 560, and/or 580, for example, subsequent to NDP 572. For example, Trigger Frame 536 may include Trigger Frame 136 (FIG. 1).

In some demonstrative embodiments, the plurality of wireless stations, e.g., STAs 502, 560, and/or 580, may transmit a plurality of NDP transmissions, e.g., in the form of Mu-NDP 538, to STA 540, e.g., subsequent to NDP 572 and trigger frame 536.

In some demonstrative embodiments, STA 540 may transmit a MU-FTM Response 574 to the plurality of wireless stations, e.g., STAs 502, 560, and/or 580, e.g., subsequent to MU-NDP 538. For example, MU-FTM Response 574 may include MU-FTM message 174 (FIG. 1).

In some demonstrative embodiments, an order of frames shown in FIG. 5 may be in accordance with an order of frames in a sounding protocol, e.g., according to an IEEE 802.11ax Specification. For example, contents of MU-NDP frames 538 may be similar to the contents of the MU-NDP frames described above with reference to FIGS. 3 and/or 4.

In some demonstrative embodiments, MU FTM protocol 200 (FIG. 2) may be modified by allowing devices 102, 160, and/or 180 (FIG. 1) to sequentially transmit multiple NDP frames to device 140 (FIG. 1), e.g., as described below with reference to FIG. 6.

Figure 6:
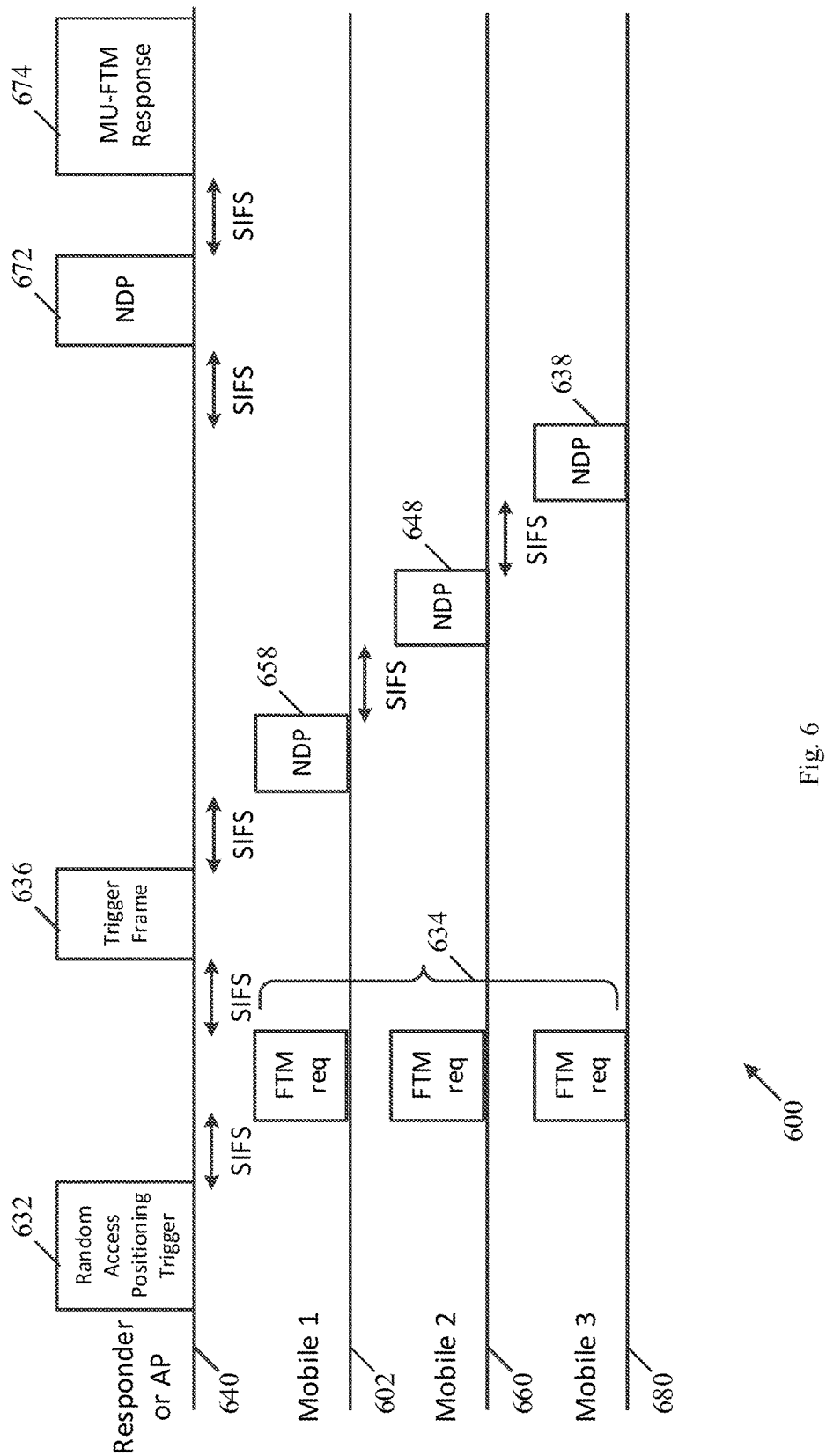
FIG. 6 is a schematic illustration of an MU FTM protocol, in accordance with some demonstrative embodiments.

Reference is made to FIG. 6, which schematically illustrates a MU FTM protocol 600 between a wireless communication STA 640 and a plurality of wireless communication STAs, e.g., STAs 602, 660, and/or 680, in accordance with some demonstrative embodiments. For example, STA 640 may perform the functionality of device 140 (FIG. 1); and/or STAs 602, 660, and/or 680 may perform the functionality of devices 102, 160, and/or 180 (FIG. 1), respectively.

In some demonstrative embodiments, STA 640 may transmit a Random Access Positioning Trigger 632 to the plurality of wireless stations, e.g., STAs 602, 660, and/or 680. For example, Random Access Positioning Trigger 632 may include positioning trigger message 132 (FIG. 1).

In some demonstrative embodiments, the plurality of wireless stations, e.g., STAs 602, 660, and/or 680 may transmit a plurality of FTM requests 634 to STA 640, e.g., in response to Random Access Positioning Trigger 632, e.g., as described above. For example, the plurality of FTM requests 634 may include the plurality of FTM requests 134 (FIG. 1).

In some demonstrative embodiments, STA 640 may transmit a Trigger Frame 636 to the plurality of wireless stations, e.g., STAs 602, 660, and/or 680, for example, subsequent to FTM requests 634. For example, Trigger Frame 636 may include Trigger Frame 136 (FIG. 1).

In some demonstrative embodiments, as shown in FIG. 6, STAs 602, 660, and/or 680 may transmit to STA 640 a sequence of two or more NDP frames including NDP transmissions, for example, a separate NDP frame for each STA. For example, STAs 602, 660, and/or 680 may transmit NDP frames 658, 648 and/or 638, respectively.

In some demonstrative embodiments, an NDP frame from a STA may include a frame legacy preamble and one or more channel sounding transmissions from the STA. For example, NDP 658 may include frame legacy preamble 301 (FIG. 3) and channel sounding symbols 303 and 305 (FIG. 3).

In some demonstrative embodiments, the sequence of two or more NDP frames may include at least first and second NDPs separated by a SIFS. For example, as shown in FIG. 6, NDP frames 658, 648 and/or 638 may be separated from each other by a SIFS.

In some demonstrative embodiments, implementing the multiple NDP frames, e.g. NDP frames 638, 648 and/or 658, may allow compatibility with one or more protocols, may minimize flow changes, may simplify mapping allocation in time, and/or may reduce synchronization requirements, e.g., by using regular frames instead of the MU-NDP. The implementation of multiple NDP frames may result in a longer transaction, which in some cases, may require mitigating clock drifts.

In some demonstrative embodiments, STA 640 may transmit a NDP 672 to the plurality of wireless stations, e.g., STAs 602, 660, and/or 680, for example, subsequent to NDP transmissions 658, 648 and/or 638

In some demonstrative embodiments, STA 640 may transmit a MU-FTM Response 674 to the plurality of wireless stations, e.g., STAs 602, 660, and/or 680, e.g., subsequent to NDP 672. For example, MU-FTM Response 674 may include MU-FTM message 174 (FIG. 1).

In some demonstrative embodiments, devices 102, 140, 160 and/or 180 (FIG. 1) may be configured to perform a MU FTM protocol, which may include a plurality of MU NDP transmissions, e.g., as described below with reference to FIG. 7.

Figure 7:
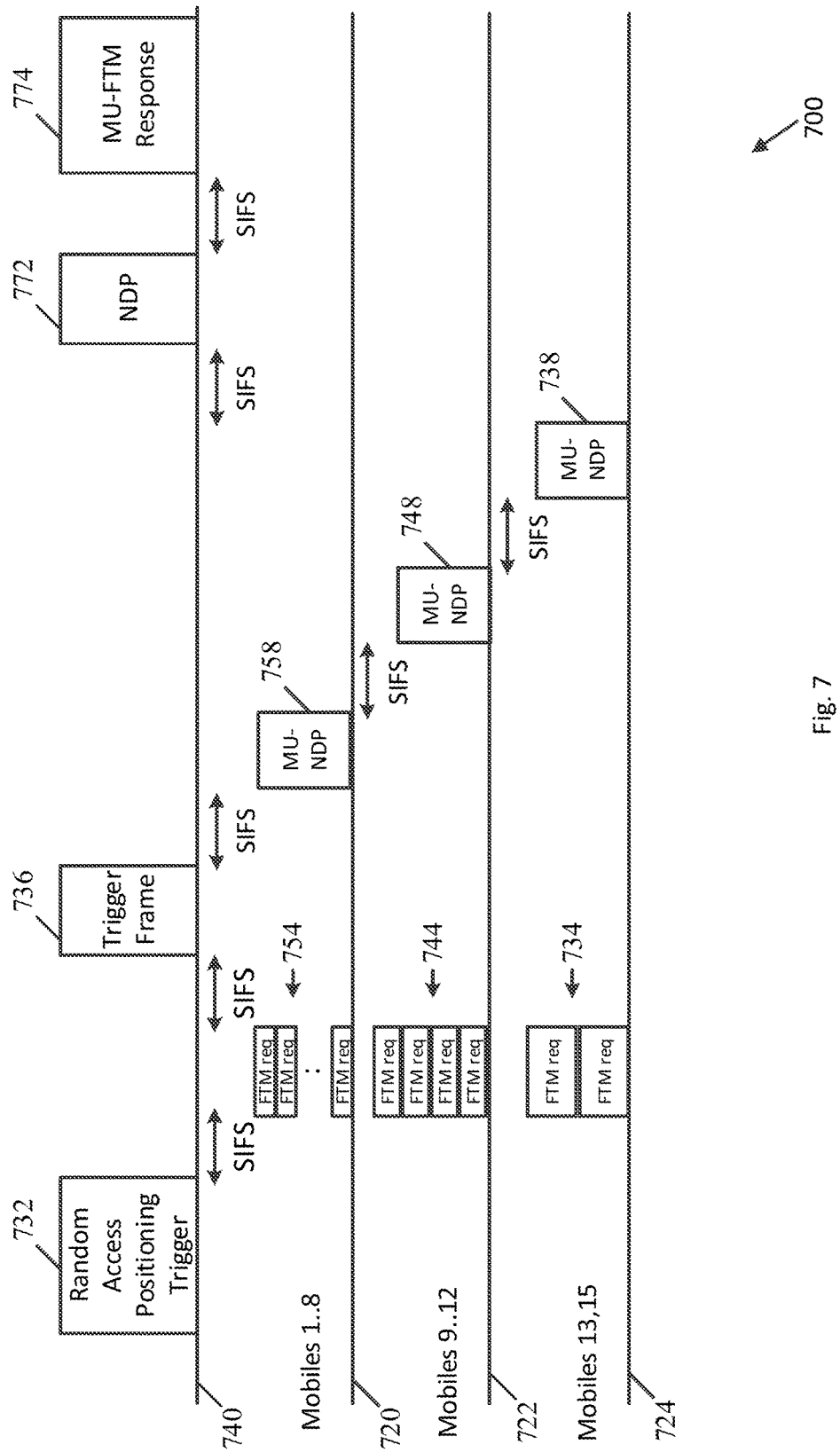
FIG. 7 is a schematic illustration of an MU FTM protocol, in accordance with some demonstrative embodiments.

Reference is made to FIG. 7, which schematically illustrates a MU FTM protocol 700 between a wireless communication STA 740 and a plurality of groups of two or more STAs, e.g., groups 720, 722, and/or 724, in accordance with some demonstrative embodiments. For example, STA 740 may perform the functionality of device 140 (FIG. 1), and/or groups 720, 722, and/or 724, may include one or more of devices 102, 160, and/or 180 (FIG. 1).

In some demonstrative embodiments, STA 740 may transmit a Random Access Positioning Trigger 732 to the plurality of wireless stations, e.g., STAs of groups 720, 722 and/or 724. For example, Random Access Positioning Trigger 732 may include positioning trigger message 132 (FIG. 1).

In some demonstrative embodiments, the plurality of wireless stations, e.g., STAs of groups 720, 722 and/or 724, may transmit to STA 740 a plurality of FTM requests, for example, including a plurality of FTM requests 754 from STAs of group 720, a plurality of FTM requests 744 from STAs of group 722 and/or a plurality of FTM requests 734 from STAs of group 724, for example, in response to Random Access Positioning Trigger 732, e.g., as described above. For example, the plurality of FTM requests 134 (FIG. 1) may include the plurality of FTM requests 734, 744, and/or 754.

In some demonstrative embodiments, STA 740 may transmit a Trigger Frame 736 to the plurality of wireless stations, e.g., STAs of groups 720, 722 and/or 724, for example, based on FTM requests 734, 744 and/or 754. For example, Trigger Frame 736 may include Trigger Frame 136 (FIG. 1).

In some demonstrative embodiments, as shown in FIG. 7, a STA, e.g., STA 740, may process a sequence of a plurality of MU-NDPs, e.g., MU-NDP transmissions 738, 748, and/or 758, from a respective plurality of groups of two or more STAs, e.g., groups 720, 722 and 724. For example, each of MU-NDP transmissions 738, 748, and/or 758 may include MU NDP 300 (FIG. 3) or MU NDP 400 (FIG. 4).

In some demonstrative embodiments, a MU-NDP, e.g., MU-NDP transmissions 738, 748, and/or 758, may include transmissions from a plurality of users, for example, of up to a predefined total number of sounding elements (antennas), e.g., a total of up to 8 antennas, or any other number of sounding elements.

For example, as shown in FIG. 7, a MU-NDP transmission, e.g., MU-NDP transmission 758 may include transmissions from a plurality of stations of group 720, e.g., including one or more of devices 102, 160, and/or 180 (FIG. 1).

In some demonstrative embodiments, the total number of sounding elements per MU-NDP may be configured, for example, in compliance with one or more Standards, for example, in compliance with a Standard limit of 8 sounding elements.

In some demonstrative embodiments, with respect to sounding and frequency allocation, it may be possible to multiplex several users in a single symbol, for example, while keeping the full BW for all the users.

For example, at least first and second users, of group 720, e.g., devices 160 and 180 (FIG. 1), may be multiplexed, such that the first user, e.g., device 160 (FIG. 1), may use a first subset of sub-carriers, e.g., the even sub-carriers, and the second user, e.g., device 180 (FIG. 1), may use a second subset of sub-carriers, e.g., the odd sub-carriers. In some cases, multiplexing users may suffer a near-far problem.

In some demonstrative embodiments, STA 740 may transmit a NDP 772 to the plurality of wireless stations, e.g., STAs of groups 720, 722 and/or 724, for example, subsequent to MU-NDP transmissions 758, 748 and/or 738

In some demonstrative embodiments, STA 740 may transmit a MU-FTM Response 774 to the plurality of wireless stations, e.g., STAs of groups 720, 722, and/or 724, e.g., subsequent to NDP 772. For example, MU-FTM Response 774 may include MU-FTM message 174 (FIG. 1).

Figure 8:
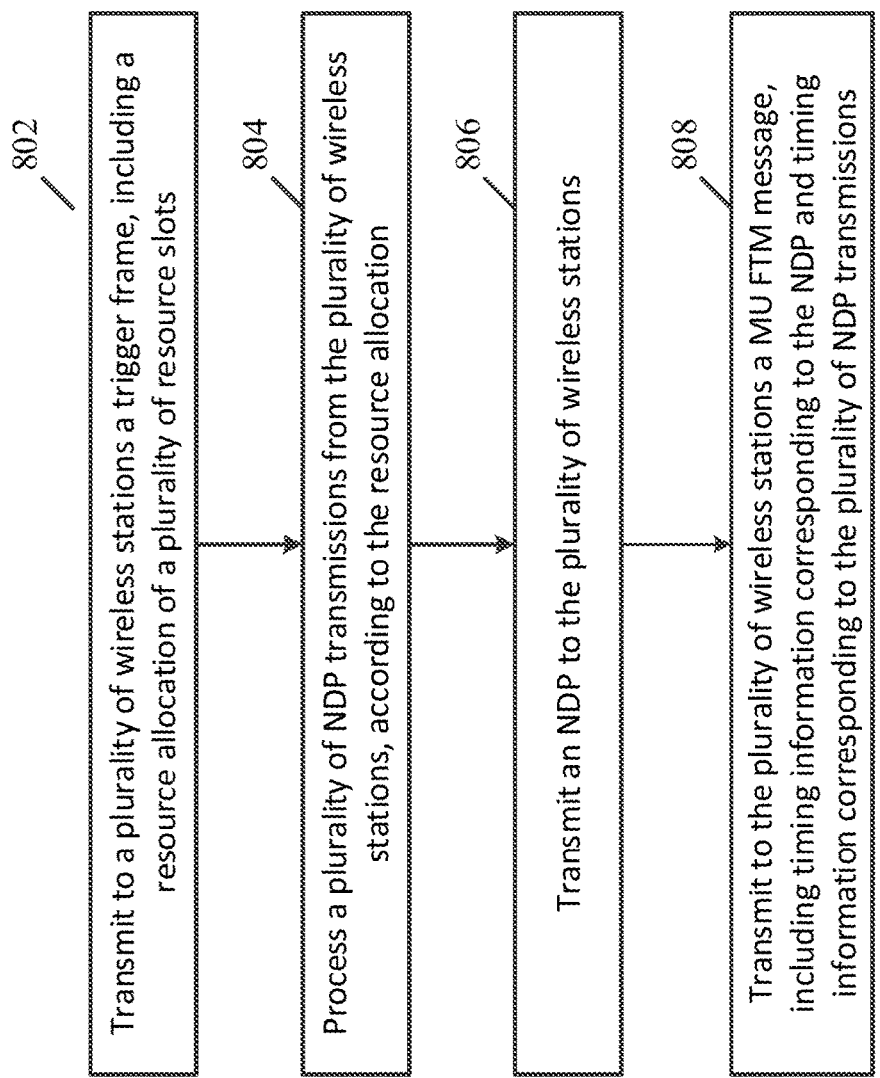
FIG. 8 is a schematic flow-chart illustration of a method of MU FTM, in accordance with some demonstrative embodiments.

Reference is made to FIG. 8, which schematically illustrates a method of MU-FTM, in accordance with some demonstrative embodiments. For example, one or more of the operations of the method of FIG. 8 may be performed by a wireless communication system, e.g., system 100 (FIG. 1); a wireless communication device, e.g., devices 102, 140, 160 and/or 180 (FIG. 1); a controller, e.g., controllers 124 and/or 154 (FIG. 1); an FTM component, e.g., FTM components 117 and/or 157 (FIG. 1); a radio, e.g., radios 114 and/or 144 (FIG. 1); a message processor, e.g., message processor 128 (FIG. 1) and/or message processor 158 (FIG. 1), a transmitter, e.g., transmitters 118 and/or 148 (FIG. 1); and/or a receiver, e.g., receivers 116 and/or 146 (FIG. 1).

As indicated at block 802, the method may include transmitting from a wireless station a trigger frame, including a resource allocation of a plurality of resource slots to a plurality of wireless stations. For example, FTM component 157 (FIG. 1) may control, cause and/or trigger device 140 (FIG. 1) to transmit trigger frame 136 (FIG. 1) to devices 102, 160 and/or 180 (FIG. 1), e.g., as described above.

As indicated at block 804, the method may include processing a plurality of NDP transmissions from the plurality of wireless stations, according to the resource allocation. For example, FTM component 157 (FIG. 1) may control, cause and/or trigger device 140 (FIG. 1) to process the plurality of NDP transmissions 138 (FIG. 1) from devices 102, 160 and/or 180 (FIG. 1) according to the resource allocation, e.g., as described above.

As indicated at block 806, the method may include transmitting a NDP from the wireless station to the plurality of wireless stations. For example, FTM component 157 (FIG. 1) may control, cause and/or trigger device 140 (FIG. 1) to transmit NDP 172 (FIG. 1) to devices 102, 160 and/or 180 (FIG. 1), e.g., as described above.

As indicated at block 808, the method may include transmitting from the wireless station to the plurality of wireless stations a MU FTM message, including timing information corresponding to the NDP and timing information corresponding to the plurality of NDP transmissions. For example, FTM component 157 (FIG. 1) may control, cause and/or trigger device 140 (FIG. 1) to transmit to devices 102, 160 and/or 180 (FIG. 1) the MU FTM 274 (FIG. 2), including timing information corresponding to NDP 272 (FIG. 2) and timing information corresponding to the plurality of NDP transmissions 138 (FIG. 1), e.g., as described above.

Figure 9:
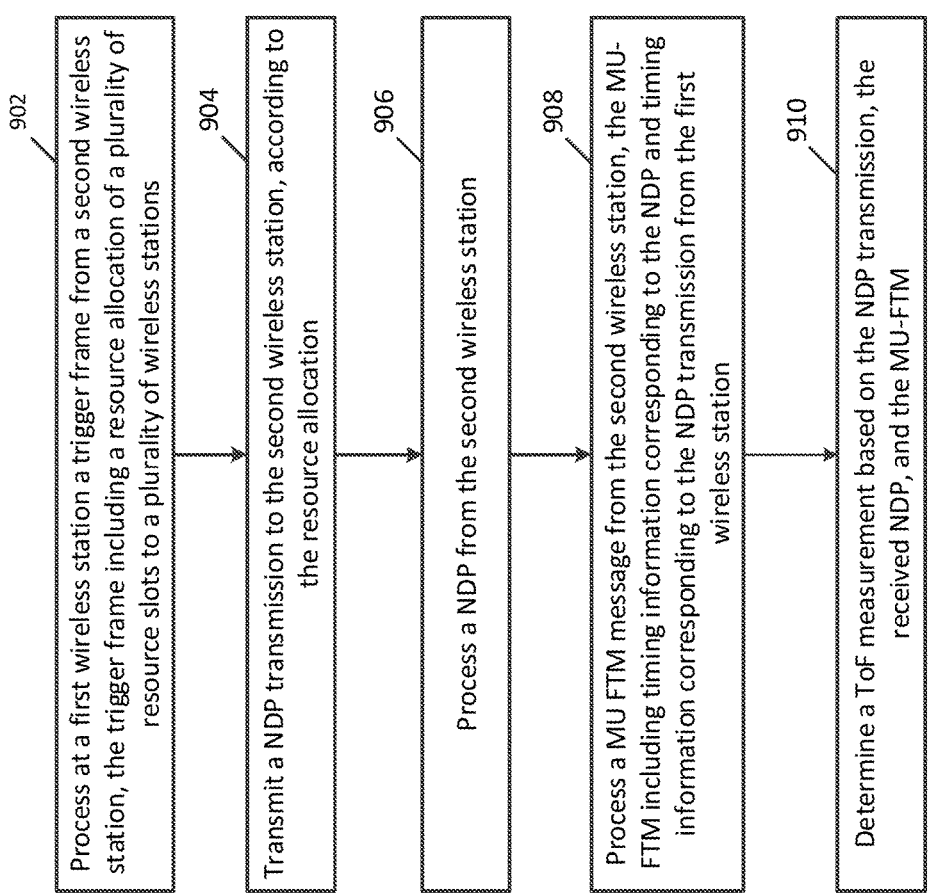
FIG. 9 is a schematic flow-chart illustration of a method of MU FTM, in accordance with some demonstrative embodiments.

Reference is made to FIG. 9, which schematically illustrates a method of MU-FTM, in accordance with some demonstrative embodiments. For example, one or more of the operations of the method of FIG. 9 may be performed by a wireless communication system, e.g., system 100 (FIG. 1); a wireless communication device, e.g., devices 102, 140, 160 and/or 180 (FIG. 1); a controller, e.g., controllers 124 and/or 154 (FIG. 1); an application, e.g., application 125 (FIG. 1), an FTM component, e.g., FTM components 117 and/or 157 (FIG. 1); a location estimator, e.g., location estimator 115 (FIG. 1); a radio, e.g., radios 114 and/or 144 (FIG. 1); a message processor, e.g., message processor 128 (FIG. 1) and/or message processor 158 (FIG. 1), a transmitter, e.g., transmitters 118 and/or 148 (FIG. 1); and/or a receiver, e.g., receivers 116 and/or 146 (FIG. 1).

As indicated at block 902, the method may include, at a first wireless station, processing a trigger frame from a second wireless station, the trigger frame including a resource allocation of a plurality of resource slots to a plurality of wireless stations. For example, FTM component 117 (FIG. 1) may control, cause and/or trigger device 102 (FIG. 1) to process trigger frame 136 (FIG. 1) from device 140 (FIG. 1), e.g., as described above.

As indicated at block 904, the method may include transmitting a NDP transmission from the first wireless station to the second wireless station, according to the resource allocation. For example, FTM component 117 (FIG. 1) may control, cause and/or trigger device 102 (FIG. 1) to transmit the NDP transmission to device 140 (FIG. 1), e.g., as described above.

As indicated at block 906, the method may include processing at the first wireless station a NDP from the second wireless station. For example, FTM component 117 (FIG. 1) may control, cause and/or trigger device 102 (FIG. 1) to process NDP 172 (FIG. 1) from device 140 (FIG. 1), e.g., as described above.

As indicated at block 908, the method may include processing at the first wireless station a MU FTM message from the second wireless station, the MU-FTM message including timing information corresponding to the NDP and/or timing information corresponding to the NDP transmission from the first wireless station. For example, FTM component 117 (FIG. 1) may control, cause and/or trigger device 102 (FIG. 1) to process MU-FTM message 174 (FIG. 1) from device 140 (FIG. 1), e.g., as described above.

As indicated at block 910, the method may include determining a ToF measurement based on the NDP transmission, the received NDP, and/or the MU-FTM message. For example, FTM component 117 (FIG. 1) may control, cause and/or trigger device 102 (FIG. 1) to determine a ToF measurement, for example, based on a ToD of an NDP transmission 138 (FIG. 1) from device 102 (FIG. 1), a ToA of NDP 172 (FIG. 1) from device 140 (FIG. 1), and/or a ToA of the NDP transmission 138 (FIG. 1) from device 102 (FIG. 1) and/or a ToD of the NDP 172 (FIG. 1) from device 140 (FIG. 1), which may be determined, for example, based on the timing information included in MU-FTM message 174 (FIG. 1) from device 140 (FIG. 1), e.g., as described above.

Figure 10:
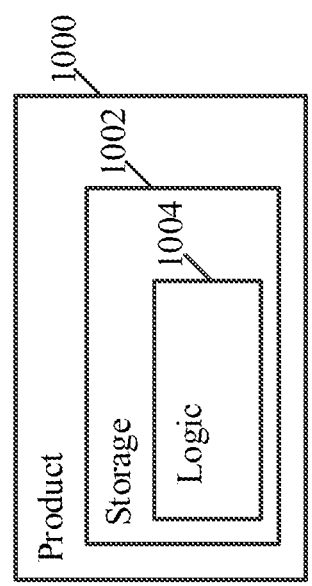
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer readable non-transitory storage media 1002, which may include computer executable instructions, e.g., implemented by logic 1004, operable to, when executed by at least one computer processor, enable at least one computer processor to implement one or more operations at devices 102, 140, 160 and/or 180 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), FTM components 117 and/or 157 (FIG. 1), location estimator 115 (FIG. 1), and/or to perform one or more operations described above with respect to FIGS. 1, 2, 3, 4, 5, 6, 7, 8, and/or 9, and/or one or more operations described herein. The phrase "computer readable non-transitory storage media" is directed to include all computer-readable media, with the sole exception being a transitory propagating signal.

In some demonstrative embodiments, product 1000 and/or storage media 1002 may include one or more types of computer-readable storage media capable of storing data, including volatile memory, non-volatile memory, removable or non-removable memory, erasable or non-erasable memory, writeable or re-writeable memory, and the like. For example, storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a wireless station to transmit a trigger frame comprising a resource allocation of a plurality of resource slots to a plurality of wireless stations; process a plurality of Non-Data Packet (NDP) transmissions from the plurality of wireless stations according to the resource allocation; transmit an NDP; and transmit a Multi-User (MU) Fine Timing Measurement (FTM) message comprising timing information corresponding to the NDP and timing information corresponding to the plurality of NDP transmissions from the plurality of wireless stations.

Example 2 includes the subject matter of Example 1, and optionally, wherein the apparatus is configured to cause the wireless station to process at least one MU NDP comprising two or more NDP transmissions from two or more wireless stations of the plurality of wireless stations.

Example 3 includes the subject matter of Example 2, and optionally, wherein the MU NDP comprises a MU NDP header from the two or more wireless stations, followed by a sequence of two or more channel sounding transmissions from the two or more wireless stations.

Example 4 includes the subject matter of Example 3, and optionally, wherein the resource allocation comprises an allocation of two or more time slots for the two or more channel sounding transmissions.

Example 5 includes the subject matter of Example 3 or 4, and optionally, wherein a channel sounding transmission comprises a plurality of channel sounding symbols from a plurality of respective antennas.

Example 6 includes the subject matter of Example 5, and optionally, wherein the plurality of channel sounding symbols comprise a plurality of long training fields from the plurality of respective antennas.

Example 7 includes the subject matter of Example 5 or 6, and optionally, wherein the channel sounding transmission comprises a short training field prior to the plurality of channel sounding symbols.

Example 8 includes the subject matter of any one of Examples 5-7, and optionally, wherein the apparatus is configured to cause the wireless station to process the MU NDP header over a frequency bandwidth, and to process a channel sounding symbol of the plurality of channel sounding symbols over the frequency bandwidth.

Example 9 includes the subject matter of any one of Examples 1-8, and optionally, wherein the apparatus is configured to cause the wireless station to process a sequence of a plurality of MU NDPs from a respective plurality of groups of two or more wireless stations.

Example 10 includes the subject matter of any one of Examples 1-9, and optionally, wherein the apparatus is configured to cause the wireless station to process a sequence of two or more NDPs comprising two or more respective NDP transmissions of the plurality of NDP transmissions.

Example 11 includes the subject matter of Example 10, and optionally, wherein the two or more NDPs comprise at least first and second NDPs separated by a Short Inter Frame Space (SIFS).

Example 12 includes the subject matter of any one of Examples 1-11, and optionally, wherein the apparatus is configured to cause the wireless station to transmit a positioning trigger message; process a plurality of FTM requests from the plurality of wireless stations; and transmit the trigger frame based at least on the plurality of FTM requests, wherein the MU FTM message comprises a MU FTM response.

Example 13 includes the subject matter of Example 12, and optionally, wherein the apparatus is configured to cause the wireless station to transmit a MU acknowledgement to acknowledge the plurality of FTM requests.

Example 14 includes the subject matter of Example 12 or 13, and optionally, wherein the positioning trigger message comprises a random access trigger message.

Example 15 includes the subject matter of any one of Examples 12-14, and optionally, wherein the apparatus is configured to cause the wireless station to transmit the NDP subsequent to reception of the plurality of FTM requests and prior to the trigger frame.

Example 16 includes the subject matter of any one of Examples 1-14, and optionally, wherein the apparatus is configured to cause the wireless station to transmit the NDP subsequent to reception of the plurality of NDP transmissions.

Example 17 includes the subject matter of any one of Examples 1-16, and optionally, wherein the resource allocation comprises at least a Time Division Duplexing (TDD) allocation of a plurality of time slots.

Example 18 includes the subject matter of any one of Examples 1-17, and optionally, wherein the MU FTM message comprises at least a plurality of Time of Arrival (ToA) values corresponding to the plurality of NDP transmissions from the plurality of wireless stations, and a Time of Departure (ToD) value corresponding to the NDP.

Example 19 includes the subject matter of any one of Examples 1-18, and optionally, wherein the MU FTM message comprises at least channel information corresponding to the plurality of NDP transmissions from the plurality of wireless stations.

Example 20 includes the subject matter of any one of Examples 1-19, and optionally, comprising a positioning responder station.

Example 21 includes the subject matter of any one of Examples 1-20, and optionally, comprising a radio, one or more antennas, a memory and a processor.

Example 22 includes a system of wireless communication comprising a wireless station, the wireless station comprising a radio; one or more antennas; a memory; a processor; and a controller configured to cause the wireless station to transmit a trigger frame comprising a resource allocation of a plurality of resource slots to a plurality of wireless stations; process a plurality of Non-Data Packet (NDP) transmissions from the plurality of wireless stations according to the resource allocation; transmit an NDP; and transmit a Multi-User (MU) Fine Timing Measurement (FTM) message comprising timing information corresponding to the NDP and timing information corresponding to the plurality of NDP transmissions from the plurality of wireless stations.

Example 23 includes the subject matter of Example 22, and optionally, wherein the controller is configured to cause the wireless station to process at least one MU NDP comprising two or more NDP transmissions from two or more wireless stations of the plurality of wireless stations.

Example 24 includes the subject matter of Example 23, and optionally, wherein the MU NDP comprises a MU NDP header from the two or more wireless stations, followed by a sequence of two or more channel sounding transmissions from the two or more wireless stations.

Example 25 includes the subject matter of Example 24, and optionally, wherein the resource allocation comprises an allocation of two or more time slots for the two or more channel sounding transmissions.

Example 26 includes the subject matter of Example 24 or 25, and optionally, wherein a channel sounding transmission comprises a plurality of channel sounding symbols from a plurality of respective antennas.

Example 27 includes the subject matter of Example 26, and optionally, wherein the plurality of channel sounding symbols comprise a plurality of long training fields from the plurality of respective antennas.

Example 28 includes the subject matter of Example 26 or 27, and optionally, wherein the channel sounding transmission comprises a short training field prior to the plurality of channel sounding symbols.

Example 29 includes the subject matter of any one of Examples 26-28, and optionally, wherein the controller is configured to cause the wireless station to process the MU NDP header over a frequency bandwidth, and to process a channel sounding symbol of the plurality of channel sounding symbols over the frequency bandwidth.

Example 30 includes the subject matter of any one of Examples 22-29, and optionally, wherein the controller is configured to cause the wireless station to process a sequence of a plurality of MU NDPs from a respective plurality of groups of two or more wireless stations.

Example 31 includes the subject matter of any one of Examples 22-30, and optionally, wherein the controller is configured to cause the wireless station to process a sequence of two or more NDPs comprising two or more respective NDP transmissions of the plurality of NDP transmissions.

Example 32 includes the subject matter of Example 31, and optionally, wherein the two or more NDPs comprise at least first and second NDPs separated by a Short Inter Frame Space (SIFS).

Example 33 includes the subject matter of any one of Examples 22-32, and optionally, wherein the controller is configured to cause the wireless station to transmit a positioning trigger message; process a plurality of FTM requests from the plurality of wireless stations; and transmit the trigger frame based at least on the plurality of FTM requests, wherein the MU FTM message comprises a MU FTM response.

Example 34 includes the subject matter of Example 33, and optionally, wherein the controller is configured to cause the wireless station to transmit a MU acknowledgement to acknowledge the plurality of FTM requests.

Example 35 includes the subject matter of Example 33 or 34, and optionally, wherein the positioning trigger message comprises a random access trigger message.

Example 36 includes the subject matter of any one of Examples 33-35, and optionally, wherein the controller is configured to cause the wireless station to transmit the NDP subsequent to reception of the plurality of FTM requests and prior to the trigger frame.

Example 37 includes the subject matter of any one of Examples 22-35, and optionally, wherein the controller is configured to cause the wireless station to transmit the NDP subsequent to reception of the plurality of NDP transmissions.

Example 38 includes the subject matter of any one of Examples 22-37, and optionally, wherein the resource allocation comprises at least a Time Division Duplexing (TDD) allocation of a plurality of time slots.

Example 39 includes the subject matter of any one of Examples 22-38, and optionally, wherein the MU FTM message comprises at least a plurality of Time of Arrival (ToA) values corresponding to the plurality of NDP transmissions from the plurality of wireless stations, and a Time of Departure (ToD) value corresponding to the NDP.

Example 40 includes the subject matter of any one of Examples 22-39, and optionally, wherein the MU FTM message comprises at least channel information corresponding to the plurality of NDP transmissions from the plurality of wireless stations.

Example 41 includes the subject matter of any one of Examples 22-40, and optionally, wherein the wireless station comprises a positioning responder station.

Example 42 includes a method to be performed at a wireless station, the method comprising transmitting a trigger frame comprising a resource allocation of a plurality of resource slots to a plurality of wireless stations; processing a plurality of Non-Data Packet (NDP) transmissions from the plurality of wireless stations according to the resource allocation; transmitting an NDP; and transmitting a Multi- User (MU) Fine Timing Measurement (FTM) message comprising timing information corresponding to the NDP and timing information corresponding to the plurality of NDP transmissions from the plurality of wireless stations.

Example 43 includes the subject matter of Example 42, and optionally, comprising processing at least one MU NDP comprising two or more NDP transmissions from two or more wireless stations of the plurality of wireless stations.

Example 44 includes the subject matter of Example 43, and optionally, wherein the MU NDP comprises a MU NDP header from the two or more wireless stations, followed by a sequence of two or more channel sounding transmissions from the two or more wireless stations.

Example 45 includes the subject matter of Example 44, and optionally, wherein the resource allocation comprises an allocation of two or more time slots for the two or more channel sounding transmissions.

Example 46 includes the subject matter of Example 44 or 45, and optionally, wherein a channel sounding transmission comprises a plurality of channel sounding symbols from a plurality of respective antennas.

Example 47 includes the subject matter of Example 46, and optionally, wherein the plurality of channel sounding symbols comprise a plurality of long training fields from the plurality of respective antennas.

Example 48 includes the subject matter of Example 46 or 47, and optionally, wherein the channel sounding transmission comprises a short training field prior to the plurality of channel sounding symbols.

Example 49 includes the subject matter of any one of Examples 46-48, and optionally, comprising processing the MU NDP header over a frequency bandwidth, and processing a channel sounding symbol of the plurality of channel sounding symbols over the frequency bandwidth.

Example 50 includes the subject matter of any one of Examples 42-49, and optionally, comprising processing a sequence of a plurality of MU NDPs from a respective plurality of groups of two or more wireless stations.

Example 51 includes the subject matter of any one of Examples 42-50, and optionally, comprising processing a sequence of two or more NDPs comprising two or more respective NDP transmissions of the plurality of NDP transmissions.

Example 52 includes the subject matter of Example 51, and optionally, wherein the two or more NDPs comprise at least first and second NDPs separated by a Short Inter Frame Space (SIFS).

Example 53 includes the subject matter of any one of Examples 42-52, and optionally, comprising transmitting a positioning trigger message; processing a plurality of FTM requests from the plurality of wireless stations; and transmitting the trigger frame based at least on the plurality of FTM requests, wherein the MU FTM message comprises a MU FTM response.

Example 54 includes the subject matter of Example 53, and optionally, comprising transmitting a MU acknowledgement to acknowledge the plurality of FTM requests.

Example 55 includes the subject matter of Example 53 or 54, and optionally, wherein the positioning trigger message comprises a random access trigger message.

Example 56 includes the subject matter of any one of Examples 53-55, and optionally, comprising transmitting the NDP subsequent to reception of the plurality of FTM requests and prior to the trigger frame.

Example 57 includes the subject matter of any one of Examples 42-55, and optionally, comprising transmitting the NDP subsequent to reception of the plurality of NDP transmissions.

Example 58 includes the subject matter of any one of Examples 42-57, and optionally, wherein the resource allocation comprises at least a Time Division Duplexing (TDD) allocation of a plurality of time slots.

Example 59 includes the subject matter of any one of Examples 42-58, and optionally, wherein the MU FTM message comprises at least a plurality of Time of Arrival (ToA) values corresponding to the plurality of NDP transmissions from the plurality of wireless stations, and a Time of Departure (ToD) value corresponding to the NDP.

Example 60 includes the subject matter of any one of Examples 42-59, and optionally, wherein the MU FTM message comprises at least channel information corresponding to the plurality of NDP transmissions from the plurality of wireless stations.

Example 61 includes the subject matter of any one of Examples 42-60, and optionally, wherein the wireless station comprises a positioning responder station.

Example 62 includes a product comprising one or more tangible computer-readable non-transitory storage media comprising computer-executable instructions operable to, when executed by at least one computer processor, enable the at least one computer processor to implement operations at a wireless station, the operations comprising transmitting a trigger frame comprising a resource allocation of a plurality of resource slots to a plurality of wireless stations; processing a plurality of Non-Data Packet (NDP) transmissions from the plurality of wireless stations according to the resource allocation; transmitting an NDP; and transmitting a Multi-User (MU) Fine Timing Measurement (FTM) message comprising timing information corresponding to the NDP and timing information corresponding to the plurality of NDP transmissions from the plurality of wireless stations.

Example 63 includes the subject matter of Example 62, and optionally, wherein the operations comprise processing at least one MU NDP comprising two or more NDP transmissions from two or more wireless stations of the plurality of wireless stations.

Example 64 includes the subject matter of Example 63, and optionally, wherein the MU NDP comprises a MU NDP header from the two or more wireless stations, followed by a sequence of two or more channel sounding transmissions from the two or more wireless stations.

Example 65 includes the subject matter of Example 64, and optionally, wherein the resource allocation comprises an allocation of two or more time slots for the two or more channel sounding transmissions.

Example 66 includes the subject matter of Example 64 or 65, and optionally, wherein a channel sounding transmission comprises a plurality of channel sounding symbols from a plurality of respective antennas.

Example 67 includes the subject matter of Example 66, and optionally, wherein the plurality of channel sounding symbols comprise a plurality of long training fields from the plurality of respective antennas.

Example 68 includes the subject matter of Example 66 or 67, and optionally, wherein the channel sounding transmission comprises a short training field prior to the plurality of channel sounding symbols.

Example 69 includes the subject matter of any one of Examples 66-68, and optionally, wherein the operations comprise processing the MU NDP header over a frequency bandwidth, and processing a channel sounding symbol of the plurality of channel sounding symbols over the frequency bandwidth.

Example 70 includes the subject matter of any one of Examples 62-69, and optionally, wherein the operations comprise processing a sequence of a plurality of MU NDPs from a respective plurality of groups of two or more wireless stations.

Example 71 includes the subject matter of any one of Examples 62-70, and optionally, wherein the operations comprise processing a sequence of two or more NDPs comprising two or more respective NDP transmissions of the plurality of NDP transmissions.

Example 72 includes the subject matter of Example 71, and optionally, wherein the two or more NDPs comprise at least first and second NDPs separated by a Short Inter Frame Space (SIFS).

Example 73 includes the subject matter of any one of Examples 62-72, and optionally, wherein the operations comprise transmitting a positioning trigger message; processing a plurality of FTM requests from the plurality of wireless stations; and transmitting the trigger frame based at least on the plurality of FTM requests, wherein the MU FTM message comprises a MU FTM response.

Example 74 includes the subject matter of Example 73, and optionally, wherein the operations comprise transmitting a MU acknowledgement to acknowledge the plurality of FTM requests.

Example 75 includes the subject matter of Example 73 or 74, and optionally, wherein the positioning trigger message comprises a random access trigger message.

Example 76 includes the subject matter of any one of Examples 73-75, and optionally, wherein the operations comprise transmitting the NDP subsequent to reception of the plurality of FTM requests and prior to the trigger frame.

Example 77 includes the subject matter of any one of Examples 62-75, and optionally, wherein the operations comprise transmitting the NDP subsequent to reception of the plurality of NDP transmissions.

Example 78 includes the subject matter of any one of Examples 62-77, and optionally, wherein the resource allocation comprises at least a Time Division Duplexing (TDD) allocation of a plurality of time slots.

Example 79 includes the subject matter of any one of Examples 62-78, and optionally, wherein the MU FTM message comprises at least a plurality of Time of Arrival (ToA) values corresponding to the plurality of NDP transmissions from the plurality of wireless stations, and a Time of Departure (ToD) value corresponding to the NDP.

Example 80 includes the subject matter of any one of Examples 62-79, and optionally, wherein the MU FTM message comprises at least channel information corresponding to the plurality of NDP transmissions from the plurality of wireless stations.

Example 81 includes the subject matter of any one of Examples 62-80, and optionally, wherein the wireless station comprises a positioning responder station.

Example 82 includes an apparatus of wireless communication by a wireless station, the apparatus comprising means for transmitting a trigger frame comprising a resource allocation of a plurality of resource slots to a plurality of wireless stations; means for processing a plurality of Non-Data Packet (NDP) transmissions from the plurality of wireless stations according to the resource allocation; means for transmitting an NDP; and means for transmitting a Multi-User (MU) Fine Timing Measurement (FTM) message comprising timing information corresponding to the NDP and timing information corresponding to the plurality of NDP transmissions from the plurality of wireless stations.

Example 83 includes the subject matter of Example 82, and optionally, comprising means for processing at least one MU NDP comprising two or more NDP transmissions from two or more wireless stations of the plurality of wireless stations.

Example 84 includes the subject matter of Example 83, and optionally, wherein the MU NDP comprises a MU NDP header from the two or more wireless stations, followed by a sequence of two or more channel sounding transmissions from the two or more wireless stations.

Example 85 includes the subject matter of Example 84, and optionally, wherein the resource allocation comprises an allocation of two or more time slots for the two or more channel sounding transmissions.

Example 86 includes the subject matter of Example 84 or 85, and optionally, wherein a channel sounding transmission comprises a plurality of channel sounding symbols from a plurality of respective antennas.

Example 87 includes the subject matter of Example 86, and optionally, wherein the plurality of channel sounding symbols comprise a plurality of long training fields from the plurality of respective antennas.

Example 88 includes the subject matter of Example 86 or 87, and optionally, wherein the channel sounding transmission comprises a short training field prior to the plurality of channel sounding symbols.

Example 89 includes the subject matter of any one of Examples 86-88, and optionally, comprising means for processing the MU NDP header over a frequency bandwidth, and processing a channel sounding symbol of the plurality of channel sounding symbols over the frequency bandwidth.

Example 90 includes the subject matter of any one of Examples 82-89, and optionally, comprising means for processing a sequence of a plurality of MU NDPs from a respective plurality of groups of two or more wireless stations.

Example 91 includes the subject matter of any one of Examples 82-90, and optionally, comprising means for processing a sequence of two or more NDPs comprising two or more respective NDP transmissions of the plurality of NDP transmissions.

Example 92 includes the subject matter of Example 91, and optionally, wherein the two or more NDPs comprise at least first and second NDPs separated by a Short Inter Frame Space (SIFS).

Example 93 includes the subject matter of any one of Examples 82-92, and optionally, comprising means for transmitting a positioning trigger message; processing a plurality of FTM requests from the plurality of wireless stations; and transmitting the trigger frame based at least on the plurality of FTM requests, wherein the MU FTM message comprises a MU FTM response.

Example 94 includes the subject matter of Example 93, and optionally, comprising means for transmitting a MU acknowledgement to acknowledge the plurality of FTM requests.

Example 95 includes the subject matter of Example 93 or 94, and optionally, wherein the positioning trigger message comprises a random access trigger message.

Example 96 includes the subject matter of any one of Examples 93-95, and optionally, comprising means for transmitting the NDP subsequent to reception of the plurality of FTM requests and prior to the trigger frame.

Example 97 includes the subject matter of any one of Examples 82-95, and optionally, comprising means for transmitting the NDP subsequent to reception of the plurality of NDP transmissions.

Example 98 includes the subject matter of any one of Examples 82-97, and optionally, wherein the resource allocation comprises at least a Time Division Duplexing (TDD) allocation of a plurality of time slots.

Example 99 includes the subject matter of any one of Examples 82-98, and optionally, wherein the MU FTM message comprises at least a plurality of Time of Arrival (ToA) values corresponding to the plurality of NDP transmissions from the plurality of wireless stations, and a Time of Departure (ToD) value corresponding to the NDP.

Example 100 includes the subject matter of any one of Examples 82-99, and optionally, wherein the MU FTM message comprises at least channel information corresponding to the plurality of NDP transmissions from the plurality of wireless stations.

Example 101 includes the subject matter of any one of Examples 82-100, and optionally, wherein the wireless station comprises a positioning responder station.

Example 102 includes an apparatus comprising circuitry and logic configured to cause a first wireless station to process a trigger frame from a second wireless station, the trigger frame comprising a resource allocation of a plurality of resource slots to a plurality of wireless stations comprising the first wireless station; transmit a Non-Data Packet (NDP) transmission to the second wireless station according to the resource allocation; process an NDP from the second wireless station; and process a Multi-User (MU) Fine Timing Measurement (FTM) message from the second wireless station, the MU FTM message comprising timing information corresponding to the NDP and timing information corresponding to the NDP transmission from the first wireless station.

Example 103 includes the subject matter of Example 102, and optionally, wherein the apparatus is configured to cause the first wireless station to transmit the NDP transmission as part of a MU NDP.

Example 104 includes the subject matter of Example 103, and optionally, wherein the apparatus is configured to cause the first wireless station to transmit the NDP transmission comprising a MU NDP header, followed by a channel sounding transmission from the first wireless station.

Example 105 includes the subject matter of Example 104, and optionally, wherein the resource allocation comprises an allocation of a time slot for the channel sounding transmission.

Example 106 includes the subject matter of Example 104 or 105, and optionally, wherein a channel sounding transmission comprises a plurality of channel sounding symbols from a plurality of respective antennas of the first wireless station.

Example 107 includes the subject matter of Example 106, and optionally, wherein the plurality of channel sounding symbols comprise a plurality of long training fields from the plurality of respective antennas.

Example 108 includes the subject matter of Example 106 or 107, and optionally, wherein the channel sounding transmission comprises a short training field prior to the plurality of channel sounding symbols.

Example 109 includes the subject matter of any one of Examples 104-108, and optionally, wherein the apparatus is configured to cause the first wireless station to transmit the MU NDP header and the channel sounding transmission over a same frequency bandwidth.

Example 110 includes the subject matter of Example 102, and optionally, wherein the apparatus is configured to cause the first wireless station to transmit an NDP comprising the NDP transmission.

Example 111 includes the subject matter of any one of Examples 102-110, and optionally, wherein the apparatus is configured to cause the first wireless station to process a positioning trigger message from the second wireless station; transmit an FTM request to the second wireless station; process the trigger frame subsequent to transmission of the FTM request message; and process an MU FTM response comprising the MU FTM message.

Example 112 includes the subject matter of Example 111, and optionally, wherein the apparatus is configured to cause the first wireless station to process a MU acknowledgement from the second wireless station to acknowledge the FTM request.

Example 113 includes the subject matter of Example 111 or 112, and optionally, wherein the positioning trigger message comprises a random access trigger message.

Example 114 includes the subject matter of any one of Examples 111-113, and optionally, wherein the apparatus is configured to cause the first wireless station to process the NDP subsequent to transmission of the FTM request and prior to the trigger frame.

Example 115 includes the subject matter of any one of Examples 102-113, and optionally, wherein the apparatus is configured to cause the first wireless station to process the NDP subsequent to transmission of the NDP transmission.

Example 116 includes the subject matter of any one of Examples 102-115, and optionally, wherein the resource allocation comprises at least a Time Division Duplexing (TDD) allocation of a plurality of time slots.

Example 117 includes the subject matter of any one of Examples 102-116, and optionally, wherein the MU FTM message comprises at least a Time of Arrival (ToA) value corresponding to the NDP transmission from the first wireless station, and a Time of Departure (ToD) value corresponding to the NDP from the second wireless station.

Example 118 includes the subject matter of any one of Examples 102-117, and optionally, wherein the MU FTM message comprises at least channel information corresponding to the NDP transmission from the first wireless station.

Example 119 includes the subject matter of any one of Examples 102-118, and optionally, wherein the second wireless station comprises a positioning responder station.

Example 120 includes the subject matter of any one of Examples 102-119, and optionally, comprising a radio, one or more antennas, a memory and a processor.

Example 121 includes a system of wireless communication comprising a first wireless station, the first wireless station comprising a radio; one or more antennas; a memory; a processor; and a controller configured to cause the first wireless station to process a trigger frame from a second wireless station, the trigger frame comprising a resource allocation of a plurality of resource slots to a plurality of wireless stations comprising the first wireless station; transmit a Non-Data Packet (NDP) transmission to the second wireless station according to the resource allocation; process an NDP from the second wireless station; and process a Multi-User (MU) Fine Timing Measurement (FTM) message from the second wireless station, the MU FTM message comprising timing information corresponding to the NDP and timing information corresponding to the NDP transmission from the first wireless station.

Example 122 includes the subject matter of Example 121, and optionally, wherein the controller is configured to cause the first wireless station to transmit the NDP transmission as part of a MU NDP.

Example 123 includes the subject matter of Example 122, and optionally, wherein the controller is configured to cause the first wireless station to transmit the NDP transmission comprising a MU NDP header, followed by a channel sounding transmission from the first wireless station.

Example 124 includes the subject matter of Example 123, and optionally, wherein the resource allocation comprises an allocation of a time slot for the channel sounding transmission.

Example 125 includes the subject matter of Example 123 or 124, and optionally, wherein a channel sounding transmission comprises a plurality of channel sounding symbols from a plurality of respective antennas of the first wireless station.

Example 126 includes the subject matter of Example 125, and optionally, wherein the plurality of channel sounding symbols comprise a plurality of long training fields from the plurality of respective antennas.

Example 127 includes the subject matter of Example 125 or 126, and optionally, wherein the channel sounding transmission comprises a short training field prior to the plurality of channel sounding symbols.

Example 128 includes the subject matter of any one of Examples 123-127, and optionally, wherein the controller is configured to cause the first wireless station to transmit the MU NDP header and the channel sounding transmission over a same frequency bandwidth.

Example 129 includes the subject matter of Example 121, and optionally, wherein the controller is configured to cause the first wireless station to transmit an NDP comprising the NDP transmission.

Example 130 includes the subject matter of any one of Examples 121-129, and optionally, wherein the controller is configured to cause the first wireless station to process a positioning trigger message from the second wireless station; transmit an FTM request to the second wireless station; process the trigger frame subsequent to transmission of the FTM request message; and process an MU FTM response comprising the MU FTM message.

Example 131 includes the subject matter of Example 130, and optionally, wherein the controller is configured to cause the first wireless station to process a MU acknowledgement from the second wireless station to acknowledge the FTM request.

Example 132 includes the subject matter of Example 130 or 131, and optionally, wherein the positioning trigger message comprises a random access trigger message.

Example 133 includes the subject matter of any one of Examples 130-132, and optionally, wherein the controller is configured to cause the first wireless station to process the NDP subsequent to transmission of the FTM request and prior to the trigger frame.

Example 134 includes the subject matter of any one of Examples 121-132, and optionally, wherein the controller is configured to cause the first wireless station to process the NDP subsequent to transmission of the NDP transmission.

Example 135 includes the subject matter of any one of Examples 121-134, and optionally, wherein the resource allocation comprises at least a Time Division Duplexing (TDD) allocation of a plurality of time slots.

Example 136 includes the subject matter of any one of Examples 121-135, and optionally, wherein the MU FTM message comprises at least a Time of Arrival (ToA) value corresponding to the NDP transmission from the first wireless station, and a Time of Departure (ToD) value corresponding to the NDP from the second wireless station.

Example 137 includes the subject matter of any one of Examples 121-136, and optionally, wherein the MU FTM message comprises at least channel information corresponding to the NDP transmission from the first wireless station.

Example 138 includes the subject matter of any one of Examples 121-137, and optionally, wherein the second wireless station comprises a positioning responder station.

Example 139 includes a method to be performed at a first wireless station, the method comprising processing a trigger frame from a second wireless station, the trigger frame comprising a resource allocation of a plurality of resource slots to a plurality of wireless stations comprising the first wireless station; transmitting a Non-Data Packet (NDP) transmission to the second wireless station according to the resource allocation; processing an NDP from the second wireless station; and processing a Multi-User (MU) Fine Timing Measurement (FTM) message from the second wireless station, the MU FTM message comprising timing information corresponding to the NDP and timing information corresponding to the NDP transmission from the first wireless station.

Example 140 includes the subject matter of Example 139, and optionally, comprising transmitting the NDP transmission as part of a MU NDP.

Example 141 includes the subject matter of Example 140, and optionally, comprising transmitting the NDP transmission comprising a MU NDP header, followed by a channel sounding transmission from the first wireless station.

Example 142 includes the subject matter of Example 141, and optionally, wherein the resource allocation comprises an allocation of a time slot for the channel sounding transmission.

Example 143 includes the subject matter of Example 141 or 142, and optionally, wherein a channel sounding transmission comprises a plurality of channel sounding symbols from a plurality of respective antennas of the first wireless station.

Example 144 includes the subject matter of Example 143, and optionally, wherein the plurality of channel sounding symbols comprise a plurality of long training fields from the plurality of respective antennas.

Example 145 includes the subject matter of Example 143 or 144, and optionally, wherein the channel sounding transmission comprises a short training field prior to the plurality of channel sounding symbols.

Example 146 includes the subject matter of any one of Examples 141-145, and optionally, comprising transmitting the MU NDP header and the channel sounding transmission over a same frequency bandwidth.

Example 147 includes the subject matter of Example 139, and optionally, comprising transmitting an NDP comprising the NDP transmission.

Example 148 includes the subject matter of any one of Examples 139-147, and optionally, comprising processing a positioning trigger message from the second wireless station; transmitting an FTM request to the second wireless station; processing the trigger frame subsequent to transmission of the FTM request message; and processing an MU FTM response comprising the MU FTM message.

Example 149 includes the subject matter of Example 148, and optionally, comprising processing a MU acknowledgement from the second wireless station to acknowledge the FTM request.

Example 150 includes the subject matter of Example 148 or 149, and optionally, wherein the positioning trigger message comprises a random access trigger message.

Example 151 includes the subject matter of any one of Examples 148-150, and optionally, comprising processing the NDP subsequent to transmission of the FTM request and prior to the trigger frame.

Example 152 includes the subject matter of any one of Examples 139-150, and optionally, comprising processing the NDP subsequent to transmission of the NDP transmission.

Example 153 includes the subject matter of any one of Examples 139-152, and optionally, wherein the resource allocation comprises at least a Time Division Duplexing (TDD) allocation of a plurality of time slots.

Example 154 includes the subject matter of any one of Examples 139-153, and optionally, wherein the MU FTM message comprises at least a Time of Arrival (ToA) value corresponding to the NDP transmission from the first wireless station, and a Time of Departure (ToD) value corresponding to the NDP from the second wireless station.

Example 155 includes the subject matter of any one of Examples 139-154, and optionally, wherein the MU FTM message comprises at least channel information corresponding to the NDP transmission from the first wireless station.

Example 156 includes the subject matter of any one of Examples 139-155, and optionally, wherein the second wireless station comprises a positioning responder station.

Example 157 includes a product comprising one or more tangible computer-readable non-transitory storage media comprising computer-executable instructions operable to, when executed by at least one computer processor, enable the at least one computer processor to implement operations at a first wireless station, the operations comprising processing a trigger frame from a second wireless station, the trigger frame comprising a resource allocation of a plurality of resource slots to a plurality of wireless stations comprising the first wireless station; transmitting a Non-Data Packet (NDP) transmission to the second wireless station according to the resource allocation; processing an NDP from the second wireless station; and processing a Multi-User (MU) Fine Timing Measurement (FTM) message from the second wireless station, the MU FTM message comprising timing information corresponding to the NDP and timing information corresponding to the NDP transmission from the first wireless station.

Example 158 includes the subject matter of Example 157, and optionally, wherein the operations comprise transmitting the NDP transmission as part of a MU NDP.

Example 159 includes the subject matter of Example 158, and optionally, wherein the operations comprise transmitting the NDP transmission comprising a MU NDP header, followed by a channel sounding transmission from the first wireless station.

Example 160 includes the subject matter of Example 159, and optionally, wherein the resource allocation comprises an allocation of a time slot for the channel sounding transmission.

Example 161 includes the subject matter of Example 159 or 160, and optionally, wherein a channel sounding transmission comprises a plurality of channel sounding symbols from a plurality of respective antennas of the first wireless station.

Example 162 includes the subject matter of Example 161, and optionally, wherein the plurality of channel sounding symbols comprise a plurality of long training fields from the plurality of respective antennas.

Example 163 includes the subject matter of Example 161 or 162, and optionally, wherein the channel sounding transmission comprises a short training field prior to the plurality of channel sounding symbols.

Example 164 includes the subject matter of any one of Examples 159-163, and optionally, wherein the operations comprise transmitting the MU NDP header and the channel sounding transmission over a same frequency bandwidth.

Example 165 includes the subject matter of Example 157, and optionally, wherein the operations comprise transmitting an NDP comprising the NDP transmission.

Example 166 includes the subject matter of any one of Examples 157-165, and optionally, wherein the operations comprise processing a positioning trigger message from the second wireless station; transmitting an FTM request to the second wireless station; processing the trigger frame subsequent to transmission of the FTM request message; and processing an MU FTM response comprising the MU FTM message.

Example 167 includes the subject matter of Example 166, and optionally, wherein the operations comprise processing a MU acknowledgement from the second wireless station to acknowledge the FTM request.

Example 168 includes the subject matter of Example 166 or 167, and optionally, wherein the positioning trigger message comprises a random access trigger message.

Example 169 includes the subject matter of any one of Examples 166-168, and optionally, wherein the operations comprise processing the NDP subsequent to transmission of the FTM request and prior to the trigger frame.

Example 170 includes the subject matter of any one of Examples 157-168, and optionally, wherein the operations comprise processing the NDP subsequent to transmission of the NDP transmission.

Example 171 includes the subject matter of any one of Examples 157-170, and optionally, wherein the resource allocation comprises at least a Time Division Duplexing (TDD) allocation of a plurality of time slots.

Example 172 includes the subject matter of any one of Examples 157-171, and optionally, wherein the MU FTM message comprises at least a Time of Arrival (ToA) value corresponding to the NDP transmission from the first wireless station, and a Time of Departure (ToD) value corresponding to the NDP from the second wireless station.

Example 173 includes the subject matter of any one of Examples 157-172, and optionally, wherein the MU FTM message comprises at least channel information corresponding to the NDP transmission from the first wireless station.

Example 174 includes the subject matter of any one of Examples 157-173, and optionally, wherein the second wireless station comprises a positioning responder station.

Example 175 includes an apparatus of wireless communication by a first wireless station, the apparatus comprising means for processing a trigger frame from a second wireless station, the trigger frame comprising a resource allocation of a plurality of resource slots to a plurality of wireless stations comprising the first wireless station; means for transmitting a Non-Data Packet (NDP) transmission to the second wireless station according to the resource allocation; means for processing an NDP from the second wireless station; and means for processing a Multi-User (MU) Fine Timing Measurement (FTM) message from the second wireless station, the MU FTM message comprising timing information corresponding to the NDP and timing information corresponding to the NDP transmission from the first wireless station.

Example 176 includes the subject matter of Example 175, and optionally, comprising means for transmitting the NDP transmission as part of a MU NDP.

Example 177 includes the subject matter of Example 176, and optionally, comprising means for transmitting the NDP transmission comprising a MU NDP header, followed by a channel sounding transmission from the first wireless station.

Example 178 includes the subject matter of Example 177, and optionally, wherein the resource allocation comprises an allocation of a time slot for the channel sounding transmission.

Example 179 includes the subject matter of Example 177 or 178, and optionally, wherein a channel sounding transmission comprises a plurality of channel sounding symbols from a plurality of respective antennas of the first wireless station.

Example 180 includes the subject matter of Example 179, and optionally, wherein the plurality of channel sounding symbols comprise a plurality of long training fields from the plurality of respective antennas.

Example 181 includes the subject matter of Example 179 or 180, and optionally, wherein the channel sounding transmission comprises a short training field prior to the plurality of channel sounding symbols.

Example 182 includes the subject matter of any one of Examples 177-181, and optionally, comprising means for transmitting the MU NDP header and the channel sounding transmission over a same frequency bandwidth.

Example 183 includes the subject matter of Example 175, and optionally, comprising means for transmitting an NDP comprising the NDP transmission.

Example 184 includes the subject matter of any one of Examples 175-183, and optionally, comprising means for processing a positioning trigger message from the second wireless station; transmitting an FTM request to the second wireless station; processing the trigger frame subsequent to transmission of the FTM request message; and processing an MU FTM response comprising the MU FTM message.

Example 185 includes the subject matter of Example 184, and optionally, comprising means for processing a MU acknowledgement from the second wireless station to acknowledge the FTM request.

Example 186 includes the subject matter of Example 184 or 185, and optionally, wherein the positioning trigger message comprises a random access trigger message.

Example 187 includes the subject matter of any one of Examples 184-186, and optionally, comprising means for processing the NDP subsequent to transmission of the FTM request and prior to the trigger frame.

Example 188 includes the subject matter of any one of Examples 175-186, and optionally, comprising means for processing the NDP subsequent to transmission of the NDP transmission.

Example 189 includes the subject matter of any one of Examples 175-188, and optionally, wherein the resource allocation comprises at least a Time Division Duplexing (TDD) allocation of a plurality of time slots.

Example 190 includes the subject matter of any one of Examples 175-189, and optionally, wherein the MU FTM message comprises at least a Time of Arrival (ToA) value corresponding to the NDP transmission from the first wireless station, and a Time of Departure (ToD) value corresponding to the NDP from the second wireless station.

Example 191 includes the subject matter of any one of Examples 175-190, and optionally, wherein the MU FTM message comprises at least channel information corresponding to the NDP transmission from the first wireless station.

Example 192 includes the subject matter of any one of Examples 175-191, and optionally, wherein the second wireless station comprises a positioning responder station.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   a memory; and
   a processor configured to cause a wireless station to:
   transmit a trigger frame comprising a resource allocation of a plurality of resource slots to a plurality of wireless stations;
   process a plurality of Non-Data Packet (NDP) transmissions from the plurality of wireless stations according to the resource allocation;
   transmit an NDP; and
   transmit a Multi-User (MU) Fine Timing Measurement (FTM) message comprising timing information corresponding to the NDP and timing information corresponding to the plurality of NDP transmissions from the plurality of wireless stations.

2. The apparatus of claim 1 configured to cause the wireless station to process at least one MU NDP comprising two or more NDP transmissions from two or more wireless stations of the plurality of wireless stations.

3. The apparatus of claim 2, wherein the MU NDP comprises a MU NDP header from the two or more wireless stations, followed by a sequence of two or more channel sounding transmissions from the two or more wireless stations.

4. The apparatus of claim 3, wherein the resource allocation comprises an allocation of two or more time slots for the two or more channel sounding transmissions.

5. The apparatus of claim 3, wherein a channel sounding transmission comprises a plurality of channel sounding symbols from a plurality of respective antennas.

6. The apparatus of claim 5, wherein the channel sounding transmission comprises a short training field prior to the plurality of channel sounding symbols.

7. The apparatus of claim 5 configured to cause the wireless station to process the MU NDP header over a frequency bandwidth, and to process a channel sounding symbol of the plurality of channel sounding symbols over the frequency bandwidth.

8. The apparatus of claim 1 configured to cause the wireless station to process a sequence of a plurality of MU NDPs from a respective plurality of groups of two or more wireless stations.

9. The apparatus of claim 1 configured to cause the wireless station to process a sequence of two or more NDPs comprising two or more respective NDP transmissions of the plurality of NDP transmissions.

10. The apparatus of claim 1 configured to cause the wireless station to:
    transmit a positioning trigger message;

process a plurality of FTM requests from the plurality of wireless stations; and transmit the trigger frame based at least on the plurality of FTM requests, wherein the MU FTM message comprises a MU FTM response.

11. The apparatus of claim 1, wherein the MU FTM message comprises at least a plurality of Time of Arrival (ToA) values corresponding to the plurality of NDP transmissions from the plurality of wireless stations, and a Time of Departure (ToD) value corresponding to the NDP.

12. The apparatus of claim 1, wherein the MU FTM message comprises at least channel information corresponding to the plurality of NDP transmissions from the plurality of wireless stations.

13. The apparatus of claim 1 comprising a radio, and one or more antennas.

14. A product comprising one or more tangible computer-readable non-transitory storage media comprising computer-executable instructions operable to, when executed by at least one processor, enable the at least one processor to cause a wireless station to:

transmit a trigger frame comprising a resource allocation of a plurality of resource slots to a plurality of wireless stations;

process a plurality of Non-Data Packet (NDP) transmissions from the plurality of wireless stations according to the resource allocation;

transmit an NDP; and transmit a Multi-User (MU) Fine Timing Measurement (FTM) message comprising timing information corresponding to the NDP and timing information corresponding to the plurality of NDP transmissions from the plurality of wireless stations.

15. The product of claim 14, wherein the MU FTM message comprises at least a plurality of Time of Arrival (ToA) values corresponding to the plurality of NDP transmissions from the plurality of wireless stations, and a Time of Departure (ToD) value corresponding to the NDP.

16. An apparatus comprising:

a memory; and a processor configured to cause a first wireless station to:

process a trigger frame from a second wireless station, the trigger frame comprising a resource allocation of a plurality of resource slots to a plurality of wireless stations comprising the first wireless station;

transmit a Non-Data Packet (NDP) transmission to the second wireless station according to the resource allocation;

process an NDP from the second wireless station; and process a Multi-User (MU) Fine Timing Measurement (FTM) message from the second wireless station, the MU FTM message comprising timing information corresponding to the NDP and timing information corresponding to the NDP transmission from the first wireless station.

17. The apparatus of claim 16 configured to cause the first wireless station to transmit the NDP transmission as part of a MU NDP.

18. The apparatus of claim 17 configured to cause the first wireless station to transmit the NDP transmission comprising a MU NDP header, followed by a channel sounding transmission from the first wireless station.

19. The apparatus of claim 18 configured to cause the first wireless station to transmit the MU NDP header and the channel sounding transmission over a same frequency bandwidth.

20. The apparatus of claim 16 configured to cause the first wireless station to:

process a positioning trigger message from the second wireless station;

transmit an FTM request to the second wireless station;

process the trigger frame subsequent to transmission of the FTM request; and process an MU FTM response comprising the MU FTM message.

21. The apparatus of claim 16, wherein the MU FTM message comprises at least a Time of Arrival (ToA) value corresponding to the NDP transmission from the first wireless station, and a Time of Departure (ToD) value corresponding to the NDP from the second wireless station.

22. The apparatus of claim 16, wherein the MU FTM message comprises at least channel information corresponding to the NDP transmission from the first wireless station.

23. The apparatus of claim 16 comprising a radio, and one or more antennas.

24. A product comprising one or more tangible computer-readable non-transitory storage media comprising computer-executable instructions operable to, when executed by at least one processor, enable the at least one processor to cause a first wireless station, to:

process a trigger frame from a second wireless station, the trigger frame comprising a resource allocation of a plurality of resource slots to a plurality of wireless stations comprising the first wireless station;

transmit a Non-Data Packet (NDP) transmission to the second wireless station according to the resource allocation;

process an NDP from the second wireless station; and process a Multi-User (MU) Fine Timing Measurement (FTM) message from the second wireless station, the MU FTM message comprising timing information corresponding to the NDP and timing information corresponding to the NDP transmission from the first wireless station.

25. The product of claim 24, wherein the MU FTM message comprises at least channel information corresponding to the NDP transmission from the first wireless station.

* * * * *